US 8,988,989 B2

(12) United States Patent
Asaie et al.

(10) Patent No.: US 8,988,989 B2
(45) Date of Patent: *Mar. 24, 2015

(54) COMMUNICATION NODE AND COMMUNICATION SYSTEM

(75) Inventors: Machiko Asaie, Koshigaya (JP); Kazuhiro Kusama, Yokohama (JP); Naomichi Nonaka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 266 days.

This patent is subject to a terminal disclaimer.

(21) Appl. No.: 13/611,288

(22) Filed: Sep. 12, 2012

(65) Prior Publication Data

US 2013/0003525 A1 Jan. 3, 2013

Related U.S. Application Data

(63) Continuation of application No. 12/482,593, filed on Jun. 11, 2009, now Pat. No. 8,279,758.

(30) Foreign Application Priority Data

Jun. 17, 2008 (JP) ................................ 2008-157376

(51) Int. Cl.
*G01R 31/08* (2006.01)
*G06F 11/14* (2006.01)
*H04L 12/24* (2006.01)

(52) U.S. Cl.
CPC ........ *G06F 11/1443* (2013.01); *H04L 41/0677* (2013.01); *H04L 41/0654* (2013.01)
USPC ....................................................... 370/225

(58) Field of Classification Search
USPC ....................................................... 370/225
See application file for complete search history.

(56) References Cited

U.S. PATENT DOCUMENTS 7,248,579 B1 7/2007 Friedman
7,447,225 B2 11/2008 Windisch et al.
(Continued)

FOREIGN PATENT DOCUMENTS

JP 2003-318899 11/2003
JP 2007-129782 5/2007
(Continued)

OTHER PUBLICATIONS

L. Berger, et al.: IETF RFC3473, "Generalized Multi-Protocol Label Switching (GMPLSs) Signaling Resource ReserVation Protocol-Traffic Engineering (RSVP-TE) Extensions", Jan. 2003 p. 1-42.
(Continued)

*Primary Examiner* — Kenny Lin
(74) *Attorney, Agent, or Firm* — Baker Botts L.L.P.

(57) ABSTRACT

Communication node including a transmission equipment which communicates user data with transmission equipment of an adjacent node, and a controller which communicates a message with a controller of the adjacent node and which manages the transmission equipment of its own node, wherein: a controller of the node detects existence or nonexistence of fault of a controller of the adjacent node on the basis of situation of receiving a message sent from the controller of the adjacent node; when the controller of the node detects the fault of the controller of the adjacent node, the controller of the node issues a state reference notice to a transmission equipment of its own node and checks existence or nonexistence of fault alert detection; in a case where the fault alert detection of the transmission equipment of the node does not exist, the controller of the node maintains a path state of the node.

17 Claims, 31 Drawing Sheets

(56) References Cited

U.S. PATENT DOCUMENTS

| | | |
|---|---|---|
| 7,468,944 B2 * | 12/2008 | Nishioka et al. ............... 370/225 |
| 7,471,625 B2 * | 12/2008 | Suemura ........................ 370/223 |
| 7,515,600 B1 | 4/2009 | Savage et al. |
| 7,804,770 B2 | 9/2010 | Ng |
| 2003/0208585 A1 | 11/2003 | Shinomiya et al. |
| 2004/0004937 A1 * | 1/2004 | Skalecki et al. ............... 370/227 |
| 2005/0237927 A1 * | 10/2005 | Kano et al. .................... 370/216 |
| 2006/0256712 A1 | 11/2006 | Imajuku et al. |
| 2006/0274645 A1 * | 12/2006 | Bradford et al. .............. 370/216 |
| 2007/0220358 A1 | 9/2007 | Goodill et al. |
| 2008/0037426 A1 | 2/2008 | Nonaka |
| 2009/0086622 A1 | 4/2009 | Ng |
| 2009/0116496 A1 * | 5/2009 | Savage et al. ................. 370/400 |

FOREIGN PATENT DOCUMENTS

| | | |
|---|---|---|
| JP | 2008-042807 | 2/2008 |
| JP | 2008-066989 | 3/2008 |

OTHER PUBLICATIONS

R. Braden, et al.: IETF RFC2205, "Resource ReSerVation Protocol (RSVP), Version 1 Functional Specification", Sep. 1997 p. 1-112.

A. Satyanarayana, et al.:RFC5063, "Extensions to GMPLS Resource Reservation Protocol (RSVP) Graceful Restart", Oct. 2007 p. 1-24.

* cited by examiner

FIG. 8

PATH STATE TABLE OF GMPLS CONTROLLER

| SESSION ID (811) | PREVIOUS HOP ADDRESS (812) | NEXT HOP ADDRESS (813) | INCOMING IF (814) | INCOMING LABEL (815) | OUTGOING IF (816) | OUTGOING LABEL (817) | ANOTHER PATH PROPERTY (818) | ANOTHER PATH PROPERTY (819) |
|---|---|---|---|---|---|---|---|---|
| 101 | 192.168.99.1 | 192.168.99.3 | IF1 | 1001 | IF2 | 2001 | | |
| 102 | 192.168.99.3 | 192.168.99.1 | IF2 | 2001 | IF1 | 1001 | | |

ADJACENT NODE STATE TABLE

| SESSION ID | UPSTREAM ADJACENT NODE | DOWNSTREAM ADJACENT NODE |
|---|---|---|
| 101 | NORMALITY | C PLANE FAULT |
| 102 | C PLANE FAULT | NORMALITY |

FIG. 9

SWITCH STATE TABLE OF TRANSMISSION EQUIPMENT CONTROLLER

| INCOMING IF | OUTGOING IF | IF STATE |
|---|---|---|
| IF1 | IF2 | USED |
| IF2 | IF1 | USED |
| IF3 | — | UNUSED |
| IF4 | — | FAULT |

FIG. 10

IF STATE TABLE OF GMPLS CONTROLLER

| INCOMING IF | OUTGOING IF | IF STATE |
|---|---|---|
| IF1 | IF2 | USED |
| IF2 | IF1 | USED |
| IF3 | — | UNUSED |
| IF4 | — | FAULT |

FIG. 11

| | SESSION ID | PREVIOUS HOP ADDRESS | NEXT HOP ADDRESS | INCOMING IF | INCOMING LABEL | OUTGOING IF | OUTGOING LABEL | ANOTHER PATH PROPERTY | ANOTHER PATH PROPERTY |
|---|---|---|---|---|---|---|---|---|---|
| GMPLS CONTROLLER A  80a | 101 | | 192.168.99.2 | — | — | IF2 | 1001 | | |
| GMPLS CONTROLLER B  80b | 101 | 192.168.99.1 | 192.168.99.3 | IF1 | 1001 | IF2 | 2001 | | |
| GMPLS CONTROLLER C  80c | 101 | 192.168.99.2 | 192.168.99.4 | IF1 | 2001 | IF2 | 3001 | | |
| GMPLS CONTROLLER D  80d | 101 | 192.168.99.3 | 192.168.99.5 | IF1 | 3001 | IF2 | 4001 | | |
| GMPLS CONTROLLER E  80e | 101 | 192.168.99.4 | | IF1 | 4001 | — | — | | |

| SESSION ID | UPSTREAM ADJACENT NODE | DOWNSTREAM ADJACENT NODE |
|---|---|---|
| 101 | — | NORMALITY |

GMPLS CONTROLLER A — 90a

| SESSION ID | UPSTREAM ADJACENT NODE | DOWNSTREAM ADJACENT NODE |
|---|---|---|
| 101 | NORMALITY | NORMALITY |

GMPLS CONTROLLER B — 90b

| SESSION ID | UPSTREAM ADJACENT NODE | DOWNSTREAM ADJACENT NODE |
|---|---|---|
| 101 | NORMALITY | NORMALITY |

GMPLS CONTROLLER C — 90c

| SESSION ID | UPSTREAM ADJACENT NODE | DOWNSTREAM ADJACENT NODE |
|---|---|---|
| 101 | NORMALITY | NORMALITY |

GMPLS CONTROLLER D — 90d

| SESSION ID | UPSTREAM ADJACENT NODE | DOWNSTREAM ADJACENT NODE |
|---|---|---|
| 101 | NORMALITY | — |

GMPLS CONTROLLER E — 90e

| | 100a | |
|---|---|---|
| INCOMING IF | OUTGOING IF | IF STATE |
| — | IF2 | RESERVED |

TRANSMISSION EQUIPMENT A

| | 100b | |
|---|---|---|
| INCOMING IF | OUTGOING IF | IF STATE |
| IF1 | IF2 | RESERVED |

TRANSMISSION EQUIPMENT B

| | 100c | |
|---|---|---|
| INCOMING IF | OUTGOING IF | IF STATE |
| IF1 | IF2 | RESERVED |

TRANSMISSION EQUIPMENT C

| | 100d | |
|---|---|---|
| INCOMING IF | OUTGOING IF | IF STATE |
| IF1 | IF2 | RESERVED |

TRANSMISSION EQUIPMENT D

| | 100e | |
|---|---|---|
| INCOMING IF | OUTGOING IF | IF STATE |
| IF1 | — | RESERVED |

TRANSMISSION EQUIPMENT E

FIG. 16

| | GMPLS Controller A (110a) | GMPLS Controller B (110b) | GMPLS Controller C (110c) | GMPLS Controller D (110d) | GMPLS Controller E (110e) |
|---|---|---|---|---|---|
| INCOMING IF | — | IF1 | IF1 | IF1 | IF1 |
| OUTGOING IF | IF2 | IF2 | IF2 | IF2 | — |
| IF STATE RESERVED | | | | | |

GMPLS CONTROLLER A (80a)

| SESSION ID | PREVIOUS HOP ADDRESS | NEXT HOP ADDRESS | INCOMING IF | INCOMING LABEL | OUTGOING IF | OUTGOING LABEL | ANOTHER PATH PROPERTY | ANOTHER PATH PROPERTY |
|---|---|---|---|---|---|---|---|---|
| 101 |  | 192.168.99.2 | — | — | IF1 | 1001 |  |  |

GMPLS CONTROLLER B (80b)

| SESSION ID | PREVIOUS HOP ADDRESS | NEXT HOP ADDRESS | INCOMING IF | INCOMING LABEL | OUTGOING IF | OUTGOING LABEL | ANOTHER PATH PROPERTY | ANOTHER PATH PROPERTY |
|---|---|---|---|---|---|---|---|---|
| 101 | 192.168.99.1 | 192.168.99.3 | IF1 | 1001 | IF2 | 2001 |  |  |

GMPLS CONTROLLER D (80d)

| SESSION ID | PREVIOUS HOP ADDRESS | NEXT HOP ADDRESS | INCOMING IF | INCOMING LABEL | OUTGOING IF | OUTGOING LABEL | ANOTHER PATH PROPERTY | ANOTHER PATH PROPERTY |
|---|---|---|---|---|---|---|---|---|
| 101 | 192.168.99.3 | 192.168.99.5 | IF1 | 3001 | IF2 | 4001 |  |  |

GMPLS CONTROLLER E (80e)

| SESSION ID | PREVIOUS HOP ADDRESS | NEXT HOP ADDRESS | INCOMING IF | INCOMING LABEL | OUTGOING IF | OUTGOING LABEL | ANOTHER PATH PROPERTY | ANOTHER PATH PROPERTY |
|---|---|---|---|---|---|---|---|---|
| 101 | 192.168.99.4 |  | IF1 | 1001 | — | — |  |  |

| GMPLS CONTROLLER A 80a | SESSION ID | PREVIOUS HOP ADDRESS | NEXT HOP ADDRESS | INCOMING IF | INCOMING LABEL | OUTGOING IF | OUTGOING LABEL | ANOTHER PATH PROPERTY | ANOTHER PATH PROPERTY |
|---|---|---|---|---|---|---|---|---|---|
| | 101 | | 192.168.99.2 | — | — | IF1 | 1001 | | |

| GMPLS CONTROLLER B 80b | SESSION ID | PREVIOUS HOP ADDRESS | NEXT HOP ADDRESS | INCOMING IF | INCOMING LABEL | OUTGOING IF | OUTGOING LABEL | ANOTHER PATH PROPERTY | ANOTHER PATH PROPERTY |
|---|---|---|---|---|---|---|---|---|---|
| | 101 | 192.168.99.1 | 192.168.99.3 | IF1 | 1001 | IF2 | 2001 | | |

| GMPLS CONTROLLER C 80c | SESSION ID | PREVIOUS HOP ADDRESS | NEXT HOP ADDRESS | INCOMING IF | INCOMING LABEL | OUTGOING IF | OUTGOING LABEL | ANOTHER PATH PROPERTY | ANOTHER PATH PROPERTY |
|---|---|---|---|---|---|---|---|---|---|
| | 101 | 192.168.99.2 | 192.168.99.4 | IF1 | 2001 | IF2 | 3001 | | |

| GMPLS CONTROLLER D 80d | SESSION ID | PREVIOUS HOP ADDRESS | NEXT HOP ADDRESS | INCOMING IF | INCOMING LABEL | OUTGOING IF | OUTGOING LABEL | ANOTHER PATH PROPERTY | ANOTHER PATH PROPERTY |
|---|---|---|---|---|---|---|---|---|---|
| | 101 | 192.168.99.3 | 192.168.99.5 | IF1 | 3001 | IF2 | 4001 | | |

| GMPLS CONTROLLER E 80e | SESSION ID | PREVIOUS HOP ADDRESS | NEXT HOP ADDRESS | INCOMING IF | INCOMING LABEL | OUTGOING IF | OUTGOING LABEL | ANOTHER PATH PROPERTY | ANOTHER PATH PROPERTY |
|---|---|---|---|---|---|---|---|---|---|
| | 101 | 192.168.99.4 | | IF1 | 1001 | — | — | | |

| GMPLS CONTROLLER A | SESSION ID | UPSTREAM ADJACENT NODE | DOWNSTREAM ADJACENT NODE |
|---|---|---|---|
| | 101 | — | NORMALITY |

90a

| GMPLS CONTROLLER B | SESSION ID | UPSTREAM ADJACENT NODE | DOWNSTREAM ADJACENT NODE |
|---|---|---|---|
| | 101 | NORMALITY | C PLANE FAULT |

90b

| GMPLS CONTROLLER C | SESSION ID | UPSTREAM ADJACENT NODE | DOWNSTREAM ADJACENT NODE |
|---|---|---|---|
| | 101 | C PLANE FAULT | C PLANE FAULT |

90c

| GMPLS CONTROLLER D | SESSION ID | UPSTREAM ADJACENT NODE | DOWNSTREAM ADJACENT NODE |
|---|---|---|---|
| | 101 | C PLANE FAULT | NORMALITY |

90d

| GMPLS CONTROLLER E | SESSION ID | UPSTREAM ADJACENT NODE | DOWNSTREAM ADJACENT NODE |
|---|---|---|---|
| | 101 | NORMALITY | — |

90e

| NODE IDENTIFIER | CONTROL PLANE | DATA PLANE |
|---|---|---|
| C | BEING FAULTY | BEING USED |
| D | BEING FAULTY | BEING FAULTY |

COMMUNICATION NODE AND COMMUNICATION SYSTEM

CROSS REFERENCE TO RELATED APPLICATION

This is a continuation of U.S. application Ser. No. 12/482,593, filed Jun. 11, 2009 now U.S. Pat. No. 8,279,758. This application relates to and claims priority from Japanese Patent Application No. 2008-157376, filed on Jun. 17, 2008. The entirety of the contents and subject matter of all of the above is incorporated herein by reference.

BACKGROUND OF THE INVENTION

1. Field of the Invention

The present invention relates to a communication node and a communication system. More particularly, it relates to a communication node and a communication system for performing data forwarding, path control, etc. in a network in which a data plane for forwarding user data, and a control plane for managing a data forwarder are made of different media.

2. Description of the Related Art

In recent years, with rise in the speed of a broadband access network, the developments of optical transmission technology have proceeded in order to realize the large-capacity transmission of a trunk network. "GMPLS" (Generalized Multi-Protocol Label Switching) is such that the label switching technique of conventional "MPLS" has been expanded also to an optical wavelength switch. More specifically, the "GMPLS" is a framework in which transmission equipments that adopt different switching techniques such as "PSC" (Packet Switch Capable), "L2SC" (Layer 2 Switch Capable), "LSC" (Lambda Switch Capable), and "FSC" (Fiber Switch Capable) are managed by a common control protocol, and which is configured of a data plane for forwarding user data, and a control plane for managing a data forwarder. The data plane and the control plane are logically separated, and can be made of different physical media.

As a prior-art technique, "RSVP-TE" (Resource ReSerVation Protocol-Traffic Engineering) is one of signaling protocols which are used for controlling a path in the GMPLS (refer to Non-patent Document 1). The "RSVP-TE" reserves resources and establishes an "LSP" (Label Switched Path) in such a way that a "Path" message which holds the ingress and egress of the path, the route thereof, switch sorts, bandwidths and the like attribute information items is propagated along the route on which the path is to be established. Besides, in order to maintain the LSP, refresh messages are exchanged between the adjacent nodes of the control plane at fixed time intervals (refer to Non-patent Document 2).

In addition, as a fault recovery method at the time when any fault has occurred on the GMPLS control plane, there has been proposed a graceful restart scheme in which, even if a controller restarts to lose a path state before the fault, the controller acquires the path state to-be-controlled from the adjacent node at the restart, whereby the path information can be recovered (refer to Non-patent Document 3).

Patent Document 1 discloses a method in which, in order to monitor the states of the data plane and the control plane, an "LSP" has been set by the "RSVP-TE", a control plane device acquires the route state of the data plane and gives notice to the external network management system of a GMPLS network.

[Non-patent document 1] L. Berger, et al.: IETF RFC3473, "Generalized Multi-Protocol Label Switching (GMPLS) Signaling Resource ReserVation Protocol-Traffic Engineering (RSVP-TE) Extensions", Jan. 2003 p1-42

[Non-patent document 2] R. Braden, et al.: IETF RFC2205, "Resource ReSerVation Protocol (RSVP), Version 1 Functional Specification", Sep. 1997 p1-112

[Non-patent document 3] A. Satyanarayana, et al.: RFC5063, "Extensions to GMPLS Resource Reservation Protocol (RSVP) Graceful Restart", Oct. 2007 p1-24

[Patent document 1] JP-A-2008-66989

SUMMARY OF THE INVENTION

In a network wherein a control plane and a data plane are made of different media, it might result in spoiling the reliability of the network that, when data is being forwarded to a path already established, the data plane forwarding the data is torn due to any fault limited to the control plane.

That is, a method in which the route states of a control plane device and a data plane device are always held in agreement as in the prior-art technique, has had the problem that the fault having occurred in only the control plane cannot be coped with.

Besides, the technique of Patent Document 1 can sense the state disagreement between the control plane and the data plane, but it cannot always ensure a path state at the fault of the control plane.

Now, problems to be solved by the present invention will be described in detail.

In a network which is subjected to the GMPLS control, with the signaling protocol "RSVP-TE" for establishing a communication path, "Path" messages are exchanged between adjacent nodes every fixed unit time, thereby to perform a soft state management for maintaining the state of the path. The fixed unit time in which the "Path" messages are exchanged is called the "refresh time", and the refresh messages are exchanged every refresh time between the adjacent nodes, thereby to maintain the state of the path.

A case where the message is not received after the lapse of the refresh time, can be sensed as the abnormality of the adjacent node. When the lapse of the refresh time (written as the "refresh timeout" below) has occurred, the node cleans up resources and tears down the path. This permits the effective use of the resources without holding them limitlessly, and serves to disconnect any failed equipment.

In a case where a control plane which is used for signaling for managing a path, and a data plane through which data passes, are made of an identical medium, the generation of refresh timeout is effective for the disconnection of any fault.

On the other hand, in a case where control planes and data planes are made of different media in order to control optical transmission equipments, it might result in spoiling the reliability of a network that, when data is being forwarded to the data plane already established, the data plane to which the data is being forwarded is torn due to any fault limited to the control plane.

Next, problems in the RSVP soft state management of the GMPLS network will be described with reference to FIG. 31, FIG. 3 and FIG. 4.

FIG. 31 is a configurational diagram of a network apparatus which is controlled by the GMPLS.

The network apparatus includes, for example, nodes A 3101, B 3102, C 3103, D 3104 and E 3105, a network 311, and a data channel 312.

When the network is configured of the five transmission equipments of a transmission equipment A 3121, a transmission equipment B 3122, a transmission equipment C 3123, a transmission equipment D 3124 and a transmission equipment E 3125, GMPLS controllers 3111, 3112, 3113, 3114 and 3115 which control the cross-connections of the transmission equipments are disposed in one-to-one correspondence with the respective transmission equipments. Each of the nodes is formed of one transmission equipment and one GMPLS controller, and the respective nodes are set as the node A 3101, node B 3102, node C 3103, node D 3104 and node E 3105. The GMPLS controller portions 3111, 3112, 3113, 3114 and 3115 and the network 311 shall be called a "control plane", while the transmission equipment portions 3121, 3122, 3123, 3124 and 3125 and the data channel 312 shall be called a "data plane".

FIG. 3 is a message sequence diagram showing state maintenance which is made by an RSVP refresh message.

When a path which starts from a node A 201, passes through a node B 202, a node C 203 and a node D 204 and arrives at a node E 205 is to be established, "Path" messages 31*a*, 31*b*, 31*c* and 31*d* are propagated among GMPLS controllers A 211, B 212, C 213, D 214 and E 215 along a route by way of example, thereby to reserve resources, and "Resv" messages 32*e*, 32*d*, 32*c* and 32*b* are propagated in the opposite direction, to thereby establish an LSP (Label Switched Path) 34.

The GMPLS controllers A 211, B 212, C 213, D 214 and E 215 set interface information items in respectively corresponding transmission equipments A 221, B 222, C 223, D 224 and E 225, on the basis of the information items of the resources reserved by the "Resv" messages. These states shall be called "control plane/data plane state synchronizations (written as C-D state synchronizations) 33*a*, 33*b*, 33*c*, 33*d* and 33*e*".

Refresh messages 36 and 37 are exchanged between the respectively adjacent nodes of the control plane every refresh time 35, thereby to maintain the state of the path.

FIG. 4 is a sequence diagram of an RSVP-TE message at the fault of a GMPLS controller.

Next, there will be described a message sequence at the time when a fault has occurred in the GMPLS controller C 213 of node C.

When, after the establishment of an LSP (400), the fault occurs in the GMPLS controller C 213 of the node C, the GMPLS controller B 212 of node B being an adjacent node and the GMPLS controller D 214 of node D being an adjacent node detect refresh timeouts 422 and 421, respectively (432 and 431).

In accordance with the soft state management of the RSVP, the GMPLS controller D 214 having detected the refresh timeout sends a "PathTear" message 441 downstream, and it removes a path state with a downstream adjacent node, in its own node (451). The node E 215 having received the "PathTear" message 441 removes the path state (461). On the other hand, the GMPLS controller B 212 having similarly detected the refresh timeout sends a "ResvTear" message 442 upstream, and it removes a path state with an upstream adjacent node, in its own node (452). The node GMPLS controller A 211 having received the "ResvTear" message 442 removes the path state (462).

At the removals of the path states, at the individual nodes, the GMPLS controllers A 211, B 212, C 213, D 214 and E 215 command the respectively corresponding transmission equipments A 221, B 222, C 223, D 224 and E 225 to tear down the paths, namely, to clean up the resources (471, 472, 473 and 474) (written as the "D plane teardown" below).

As stated above, the prior art has had the problem that, in a case where the transmission equipment A 221, B 222, C 223, D 224 or E 225 does not have any abnormality in spite of the occurrence of the fault in the GMPLS controller A 211, B 212, C 213, D 214 or E 215, it tears down the path already forwarding the data that the transmission equipments A 221, B 222, C 223, D 224 and E225 are commanded to clean up the resources.

Besides, with the prior art, the occurrence of the refresh timeout can be suppressed by setting the refresh time at a limitless magnitude, but the alteration or abnormality of the adjacent node cannot be detected in some cases.

Further, each of the GMPLS controllers A 211, B 212, C 213, D 214 and E 215 of the control plane can have the graceful restart function of inhibiting a refresh timer for a recovery period declared beforehand and postponing the teardown of the path, when any fault has occurred in the control plane. However, when the fault has been recovered after the recovery period estimated beforehand, the path of the data plane cannot be guaranteed in some cases.

FIG. 5 is a sequence diagram of an RSVP-TE message at the fault of the GMPLS controller which has the graceful restart function.

Next, there will be described a message sequence in a graceful restart mode.

By way of example, when the node C 213 has declared a recovery capability and a recovery period to its adjacent nodes by "Hello" messages 503 and 504 beforehand, refresh is inhibited during the recovery period 540 in the adjacent nodes (531 and 532) which have detected the occurrence 510 of any fault. However, in a case where the wait time has lapsed, a "PathTear" message 541 and a "ResvTear" message 542 are respectively sent to the adjacent nodes, and the path states of the pertinent nodes are removed (551 and 552). When the node C 213 has restarted after the lapse of the recovery period 540, the path states relevant to the node C 213 have already been removed (551 and 552), and also the resources of the data plane have been cleaned up (571, 572, 573 and 574).

This has led to the problem that, when the recovery period cannot be estimated or when an unexpected long time has been required, the path forwarding the data cannot always be guaranteed even with the graceful restart function.

In view of the above drawbacks, the present invention has for its object to provide communication nodes and a communication system in which, in case of any fault limited to a control plane, data forwarding is continued without tearing down the path of a data plane already established and being used, whereby the fault can be recovered without the reassignment of resources.

Another object of the invention is to provide communication nodes and a communication system which can attain both the prevention of a resource leakage at any fault of a data plane and the prevention of the erroneous teardown of a path attributed to any fault of a control plane.

A communication system according to the present invention can be configured of, for example:

a plurality of controllers which communicate a "Path" message;

a plurality of data forwarders which individually correspond to the respective controllers;

means for connecting the respective controllers; and means for connecting the respective data forwarders;

wherein:

each of the controllers includes:

means for retaining path information;

means for exchanging the "Path" message at fixed time intervals between the pertinent controller and the adjacent controller;

means for retaining a state of the adjacent controller;

means for commanding the data forwarder to assume a data channel state;

means for acquiring the data channel state of the data forwarder;

means for retaining the data channel state of the data forwarder;

means for sensing suspension of sending of the "Path" message when a fault has occurred in any of the plurality of controllers; and means for generating a path state maintaining command when it has been sensed that the fault of the data forwarder does not exist; and each of the data forwarders includes:

means for detecting a fault of a data channel;

means for conveying the fault of the data channel to the controller; and means for retaining the data channel state.

Besides, the controller may well include:

means for sensing suspension of sending of the "Path" message when a fault has occurred in any of the plurality of controllers; and means for generating a path state discarding command when it has been sensed that the fault of the data forwarder exists.

Further, the controller may well include means for generating a faulty controller identification number and path-control abnormal state information, and means for sending the generated number and information to that one of the plurality of controllers which has sent the "Path" message, when it has been sensed that the fault of the data forwarder does not exist. Besides, the controller may well include means for generating a fault-recovery controller identification number and path-control state recovery information, and means for sending the generated number and information to that one of the plurality of controllers which has sent the "Path" message, in a case where the controller includes means for sensing recovery of the faulty controller and where the recovery of the faulty controller has been sensed.

Still further, the controller may well include means for sensing recovery of the faulty controller, and means for conveying retained pertinent path information when the recovery of the faulty controller has been sensed or when the faulty controller has made a request for recovering the path information, and the faulty controller may well include means for recovering the path information by using the conveyed pertinent path information.

Yet further, that one of the plurality of controllers which has sent the "Path" message may well include a table which manages the received faulty controller identification number and path control state information.

In addition, that one of the plurality of controllers which has sent the "Path" message may well issue an alert to a path establishment command which passes through a faulty controller, with reference to a faulty controller identification number and a path-control state information management table, when a new path establishment command is to be sent.

According to the first solving means of this invention, there is provided a communication node in a network having the plurality of nodes, each comprising a transmission equipment which communicates user data with a transmission equipment of an adjacent node, and a controller which communicates a message with a controller of the adjacent node and which manages the transmission equipment of its own node, the network being such that a data plane into which the plurality of transmission equipments are connected and which communicates the user data, and a control plane into which the plurality of controllers are connected and which communicates the messages, are configured of different media, wherein:

a second controller of a second node adjacent to a first node exchanges a message with a first controller of the first node, thereby to detect existence or nonexistence of a fault of the first controller;

when the second controller detects the fault of the first controller of the first node being adjacent, the second controller checks existence or nonexistence of fault alert detection of a second transmission equipment of its own node;

in a case where the fault alert detection of the second transmission equipment does not exist, the second controller maintains a path state of the second controller, and when the normal controller exists in the adjacent node on an opposite side to the first controller whose fault has been detected, the second controller sends the message to the normal controller and maintains the path state with the adjacent node; and in a converse case, where the fault alert detection of the second transmission equipment exists, the second controller removes an entry of the path state in a path state table which is included in the second controller and which stores path states, and then cleans up resources.

According to the second solving means of this invention, there is provided a communication node in a network having the plurality of nodes, each comprising a transmission equipment which communicates user data with a transmission equipment of an adjacent node, and a controller which communicates a message with a controller of the adjacent node and which manages the transmission equipment of its own node, the network being such that a data plane into which the plurality of transmission equipments are connected and which communicates the user data, and a control plane into which the plurality of controllers are connected and which communicates the messages, are configured of different media, wherein:

a second controller of a second node adjacent to a first node exchanges a message with a first controller of the first node, thereby to detect existence or nonexistence of a fault of the first controller;

when the second controller has detected the fault of the first controller of the first node being adjacent, the second controller checks existence or nonexistence of fault alert detection of a second transmission equipment of its own node;

in a case where the fault alert detection exists in the second transmission equipment, the second controller removes a path state of the second controller and cleans up resources, and further, the second controller decides if the normal controller adjacent on a downstream side exists, the second controller decides whether or not its own node is an upstream path ingress node when the normal controller does not exist, and sends control-plane and data-plane fault notices concerning downstream adjacency, to the controller of the path ingress node, when its own node is not the path ingress node; and in a converse case where the fault alert detection does not exist in the second transmission equipment, the second controller maintains the state of the path, and sends a refresh message to the normal controller adjacent on the downstream side when the normal controller exists, and, the second controller decides whether or not its own node is the path ingress node, when the normal controller adjacent on the downstream side does not exist, and sends the control-plane fault notice concerning the downstream adjacency, to the controller of the path ingress node when its own node is not the path ingress node.

According to the third solving means of this invention, there is provided a communication system having the plurality of nodes, each comprising a transmission equipment which communicates user data with a transmission equipment of an adjacent node, and a controller which communicates a message with a controller of the adjacent node and which manages the transmission equipment of its own node, the network being such that a data plane into which the plurality of transmission equipments are connected and which communicates the user data, and a control plane into which the plurality of controllers are connected and which communicates the messages, are configured of different media, wherein:

a second controller of a second node adjacent to a first node exchanges a message with a first controller of the first node, thereby to detect existence or nonexistence of a fault of the first controller;

when the second controller detects the fault of the first controller of the first node being adjacent, the second controller checks existence or nonexistence of fault alert detection of a second transmission equipment of its own node;

in a case where the fault alert detection of the second transmission equipment does not exist, the second controller maintains a path state of the second controller, and when the normal controller exists in the adjacent node on an opposite side to the first controller whose fault has been detected, the second controller sends the message to the normal controller and maintains the path state with the adjacent node; and in a converse case, where the fault alert detection of the second transmission equipment exists, the second controller removes an entry of the path state in a path state table which is included in the second controller and which stores path states, and then cleans up resources.

According to the present invention, it is possible to provide communication nodes and a communication system in which, in case of a control channel fault, data forwarding can be continued without tearing down the path of a data plane already established and being used, and the fault can be recovered without reassigning resources.

Further, according to the invention, it is possible to provide communication nodes and a communication system which can attain both the prevention of a resource leakage in a data plane fault and the prevention of the erroneous teardown of a path attributed to a control plane fault.

BRIEF DESCRIPTION OF THE DRAWINGS

FIG. 8 is a diagram for explaining a path state table in the first embodiment;

FIG. 9 is a diagram for explaining an adjacent node state table in the first embodiment;

FIG. 10 is a diagram for explaining the switch state table of the transmission equipment controller in the first embodiment;

FIG. 11 is a diagram for explaining the IF state table of the GMPLS controller in the first embodiment;

FIG. 14 is a diagram for explaining the path state table at the establishment of an LSP in the first embodiment;

FIG. 15 is a diagram for explaining the adjacent node table at the LSP establishment in the first embodiment;

FIG. 16 is a diagram for explaining the switch state table of the transmission equipment at the LSP establishment in the first embodiment;

FIG. 17 is a diagram for explaining the IF state table of the GMPLS control portion as is managed in the GMPLS control portion, at the LSP establishment in the first embodiment;

FIG. 18 is a diagram for explaining the path state table at the fault occurrence of the GMPLS controller C in the first embodiment;

FIG. 24 is a diagram for explaining a path state table in the second embodiment;

FIG. 25 is a diagram for explaining an adjacent node state table in the second embodiment;

FIG. 29 is a diagram for explaining a fault table in the third embodiment;

DESCRIPTION OF THE PREFERRED EMBODIMENTS

1. First Embodiment
1-1. Network and Apparatus Configuration

Figure 2:
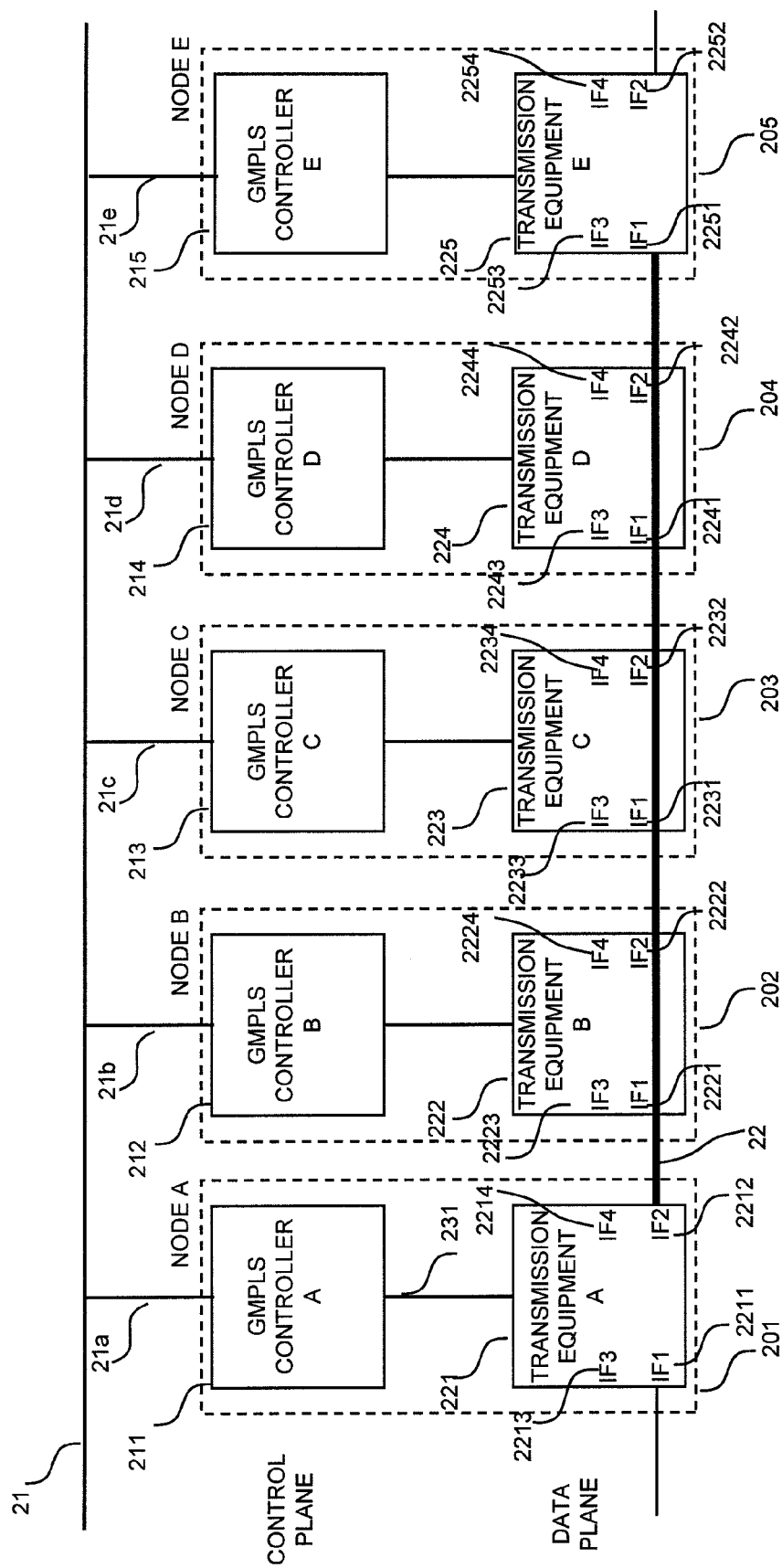
FIG. 2 is a configurational diagram of a network apparatus which is controlled with "GMPLS", in a first embodiment.

FIG. 2 is a configurational diagram of a network apparatus which is controlled with the GMPLS, in a first embodiment.

The network apparatus includes, for example, nodes A 201, B 202, C 203, D 204 and E 205, a network 21 (21a to 21e), and a data channel 22.

By way of example, when the network is configured of five transmission equipments A 221, B 222, C 223, D 224 and E 225 as shown in the figure, GMPLS controllers A 211, B 212, C 213, D 214 and E 215 which control the cross-connections of the respective transmission equipments A 221, B 222, C 223, D 224 and E 225 correspond in one-to-one correspondence. In this case, each of the nodes is formed of one transmission equipment and one GMPLS controller, and the respective nodes are set as the node A 201, node B 202, node C 203, node D 204 and node E 205. More specifically, the node A 201 has the GMPLS controller A 211, a transmission equipment A 221, and a transmission path 231 within the node. Besides, the nodes B 202, C 203, D 204 and E 205 have similar configurations. In addition, the transmission equipment A 221 has an IF1 2211, an IF2 2212, an IF3 2213 and an IF4 2214. Likewise, the transmission equipment B 222 has an IF1 2221 to an IF4 2224, while the transmission equipment C 223 has an IF1 2231 to an IF4 2234. Also, the transmission equipments D 224 and E 225 are similar, and the transmission equipment D 224 has an IF1 2241 to an IF4 2244, while the transmission equipment E 225 has an IF1 2251 to an IF4 2254.

For example, the GMPLS controllers A 211, B 212, C213, D 214 and E 215 and the network 21 shall be called a "control plane". Besides, for example, the transmission equipments A 221, B 222, C 223, D 224 and E 225 and the data channel 22 shall be called a "data plane". Besides, in this example, an upstream expresses the left side of the figure, and a downstream expresses the right side of the figure.

Figure 6:
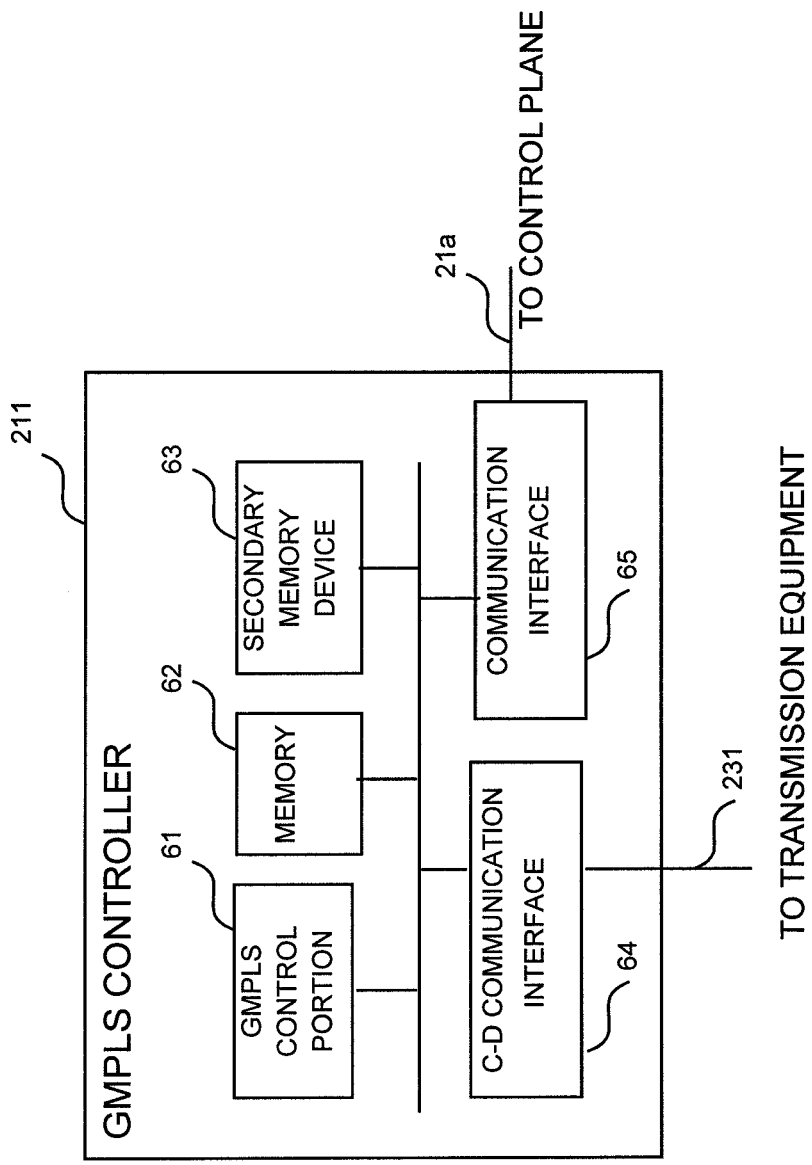
FIG. 6 is a configurational diagram of the GMPLS controller in the first embodiment.

FIG. 6 is a configurational diagram of the GMPLS controller in the first embodiment.

The GMPLS controller A 211 includes, for example, a GMPLS control portion 61, a memory 62, a secondary memory device 63, a C-D communication interface 64 and a communication interface 65. Besides, the GMPLS controller A 211 is connected with the corresponding transmission equipment A 222 by the C-D communication interface 64 (231). In addition, the GMPLS controller A 211 communicates with the other GMPLS controllers B 212, C 213, D 214 and E 215 of the control plane through the communication interface 65 and the network 21a. Incidentally, each of the other GMPLS controllers B 212, C 213, D 214 and E 215 has a similar configuration.

Figure 7:
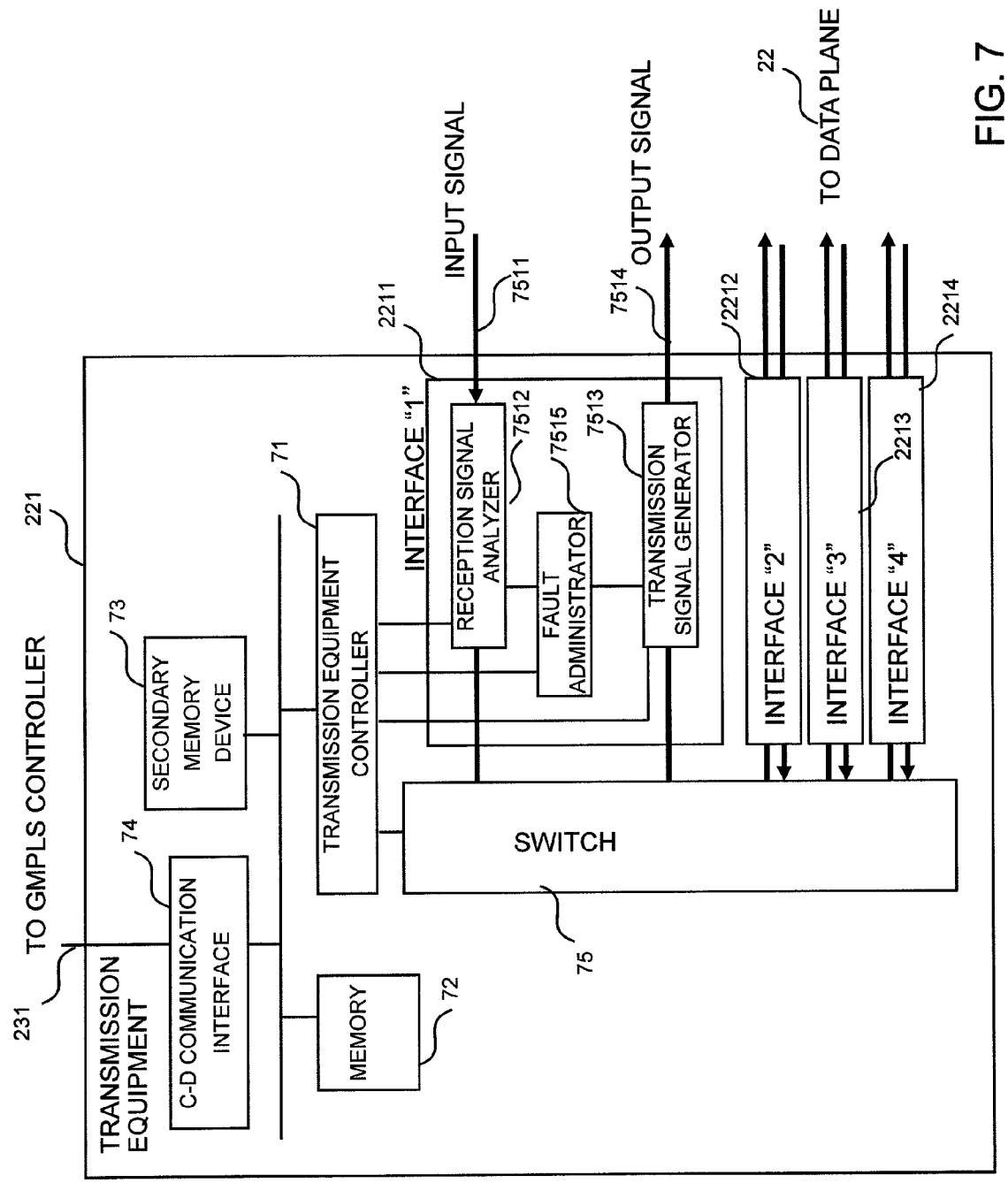
FIG. 7 is a configurational diagram of a transmission equipment in the first embodiment.

FIG. 7 is a configurational diagram of the transmission equipment in the first embodiment.

The transmission equipment A 221 includes, for example, a transmission equipment controller 71, a switch 75, interfaces 2211, 2212, 2213 and 2214, a memory 72, a secondary memory device 73, and a C-D communication interface 74. Besides, the interface "1" 2211 has a reception signal analyzer 7512, a transmission signal generator 7513, and a fault administrator 7515. Incidentally, each of the interface "2" 2212, the interface "3" 2213 and the interface "4" 2214 has a similar configuration. Although the four interfaces are shown in this example, the interfaces can be disposed in an appropriate number without being restricted thereto.

The transmission equipment A 221 is connected with the corresponding GMPLS controller A 211 by the communication interface 74 and the transmission path 231 within the node. The switch 75 has the function of changing-over the inputs/outputs of the interface "1" 2211, interface "2" 2212, interface "3" 2213 and interface "4" 2214. The interface "1" 2211, for example, receives an input signal 7511 and analyzes the signal by the reception signal analyzer 7512. In addition, this interface generates an output signal 7514 by the transmission signal generator 7513 and sends the generated signal. The fault administrator 7515 analyzes whether or not a fault signal is contained in, for example, the input signal 7511, so as to convey a result to the transmission equipment controller 71. Besides, if any abnormality exists in, for example, the pertinent transmission equipment A 221, a fault alert signal is inserted, and the output signal 7514 is generated by the transmission signal generator 7513 and then sent. Thus, in the adjacent node, the input signal is analyzed, whereby a fault alert can be detected, and the existence of the fault in the data plane can be recognized.

FIG. 8 is a diagram for explaining a path state table in the first embodiment.

By way of example, the path state table 80 is stored in the memory 62 of the GMPLS controller 211, and it is used for managing the path states of the RSVP-TE by the GMPLS controller 61. In correspondence with, for example, a session ID 811, the path state table 80 stores a previous hop address 812, a next hop address 813, an incoming interface (written as "IF") identifier 814, an incoming label 815, an outgoing interface (written as "IF") identifier 816, an outgoing label 817, and other path properties 818 and 819. Incidentally, entries 801 and 802 are rows which express the states of the respective paths. By the way, in this embodiment, IDs, symbols or the likes are used as information items for identifying sessions, but other appropriate identification information items capable of identifying the sessions may well be used.

FIG. 9 is a diagram for explaining an adjacent node state table in the first embodiment.

The adjacent node state table 90 stores the states of an upstream adjacent node 912 and a downstream adjacent node 913 in correspondence with, for example, a session ID 911. Incidentally, entries 901 and 902 are rows which express path states, respectively. The "upstream adjacent node 912" indicates an adjacent node on a side near to an ingress node for sending a "Path" message, while the "downstream adjacent node 913" indicates an adjacent node on a side near to an egress node for propagating the "Path" message. Besides, a state "normality" 922, for example, indicates that the adjacent node is operating without the report of any fault, and a "C plane fault" 921 indicates that a response cannot be confirmed between the adjacent GMPLS controllers. By the way, in this embodiment, IDs, symbols or the likes are used as information items for identifying sessions, but other appropriate identification information items capable of identifying the sessions may well be used.

FIG. 10 is a diagram for explaining the switch state table of the transmission equipment controller in the first embodiment.

The switch state table 100 is stored in the memory 72 of, for example, the transmission equipment A 221, and it expresses switch states which are managed by the transmission equipment controller 71. This switch state table 100 stores, for example, an input IF 1011, an output IF 1012 and an IF state 1013 in association. Incidentally, the input IF 1011 and the output IF 1012 are in one-to-one correspondence with the input IF 814 and output IF 816 of the path state table 80, respectively. Besides, the IF state 1013 has a state, for example, an unused state, a reserved state, a used state, a fault state, or a fault alert detection state. Regarding the state transition of the IF state 1013, by way of example, an initial state is the unused state, and it is altered into the reserved state when a path is established by an RSVP-TE message. Further, it is altered into the used state when the transmission equipment controller 71 recognizes that data has flowed through the interface "1" 2211, interface "2" 2212, interface "3" 2213 or interface "4" 2214 of the transmission equipment A 211. Besides, a fault state or a fault alert detection state is set, for example, when any abnormality has been detected in the switch 75 or when the fault administrator 7515 has detected any fault in a case where a signal reporting the abnormality has arrived at the interface "1" 2211, interface "2" 2212, interface "3" 2213 or interface "4" 2214 through the data plane.

FIG. 11 is a diagram for explaining the IF state table of the GMPLS controller in the first embodiment.

The IF state table 110 of the GMPLS controller is a copy of the switch state table 100 of the transmission equipment. This IF state table 110 of the GMPLS controller is stored in, for example, the memory 62 of the GMPLS controller A 211. By way of example, the GMPLS controller can accept the information of the switch state table 100 by accessing the transmission equipment every fixed time or at a predetermined time, and it can store the information in the IF state table 110 of the GMPLS controller in its own memory.

Figure 12:
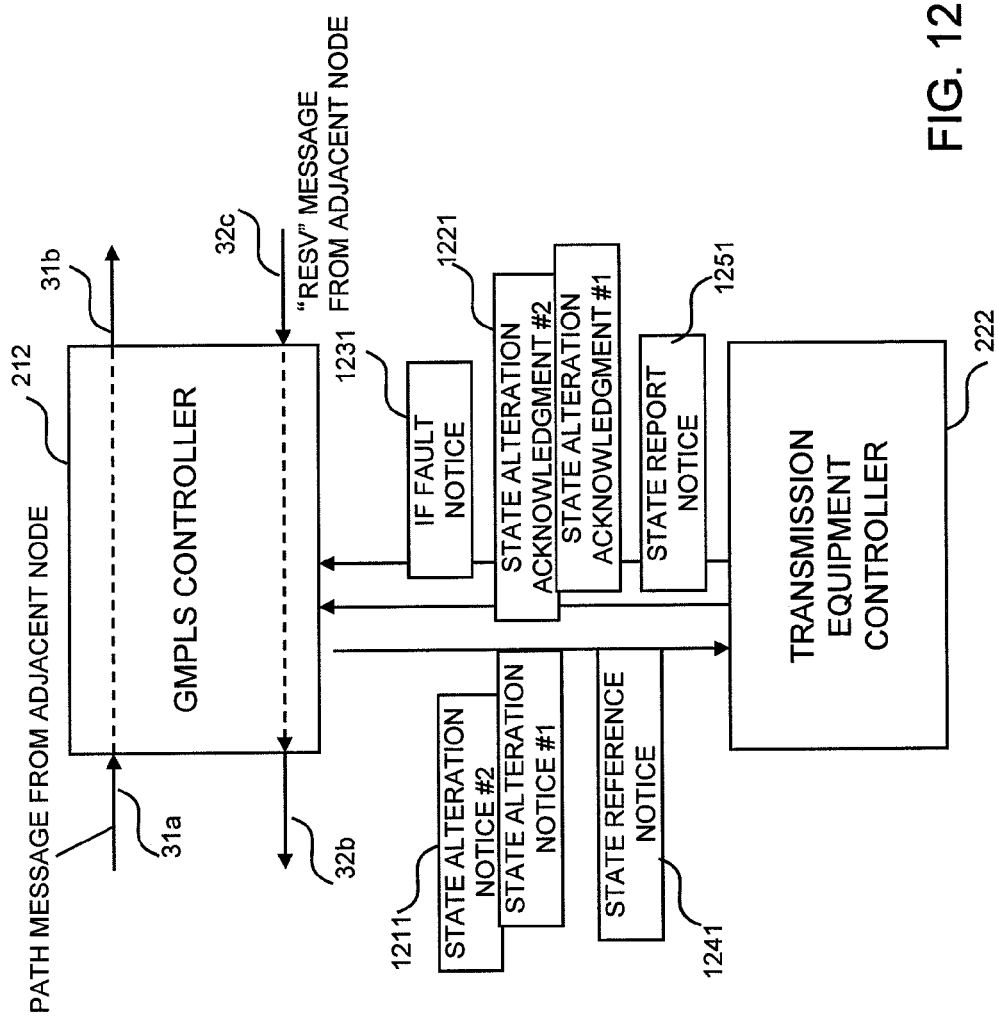
FIG. 12 is a diagram for explaining a method for the state synchronization between the GMPLS controller and transmission equipment controller in the first embodiment.

FIG. 12 is a diagram for explaining a method for the state synchronization between the GMPLS controller and transmission equipment controller in the first embodiment.

By way of example, the GMPLS controller B 212 receives a "Path" message 31a from the adjacent node, it sets the items of the corresponding incoming label 815, etc. in the path state table 80, and it propagates a "Path" message 31b to the downstream adjacent node. When the GMPLS controller B 212 receives a "Resv" message 32c for reserving resources, it sets the items of the corresponding outgoing label 816, etc. in the path state table 80, and it propagates a "Resv" message 32b to the upstream adjacent node. Concretely, by way of example, when the GMPLS controller B 212 receives the "Path" message 31a, it can set the items of the previous hop address 812, incoming label 815 and other path property 818, in correspondence with the corresponding session ID of the path state table 80. Besides, by way of example, when the GMPLS controller B 212 receives the "Resv" message 32c, it can set the items of the next hop address 813, outgoing label 816 and other path property 819, in correspondence with the corresponding session ID of the path state table 80.

Further, by way of example, the GMPLS controller B 212 sends a path state alteration notice 1211 to the transmission equipment B 222, and it sets the IF state of the switch state table 100. The transmission equipment B 222 returns a state alteration acknowledgment 1221 to the GMPLS controller B 212, thereby to notify the completion of a state alteration. Besides, when any interface fault has been confirmed in the transmission equipment B 222, this transmission equipment B 222 sends an IF fault notice 1231 to the GMPLS controller B 212. The GMPLS controller B 212 having received the state alteration acknowledgment 1221 or the IF fault notice 1231 sets the corresponding value in the IF state table 110 of the GMPLS controller, thereby to create the copy of the switch state table 100 of the transmission equipment B 221. Thus, the state synchronization between the GMPLS controller 61 and the transmission equipment controller 71 is completed.

Besides, if necessary by way of example, the GMPLS controller B 212 issues a state reference notice 1241 to the transmission equipment B 222, and it receives a state report notice 1251, whereby it can acquire the switch state of the transmission equipment B 222.

Incidentally, the GMPLS controller B 212 can be configured so as to send the state alteration notice 1211 or the state reference notice 1241 to the transmission equipment B 222, every fixed time interval or at a set time by way of example. Likewise, the transmission equipment B 222 can be configured so as to send the IF fault notice 1231, the state alteration acknowledgment 1221 or the state report notice 1251 to the GMPLS controller B 212, every fixed time interval or at a set time by way of example.

1-2. Flow Chart

Figure 1:
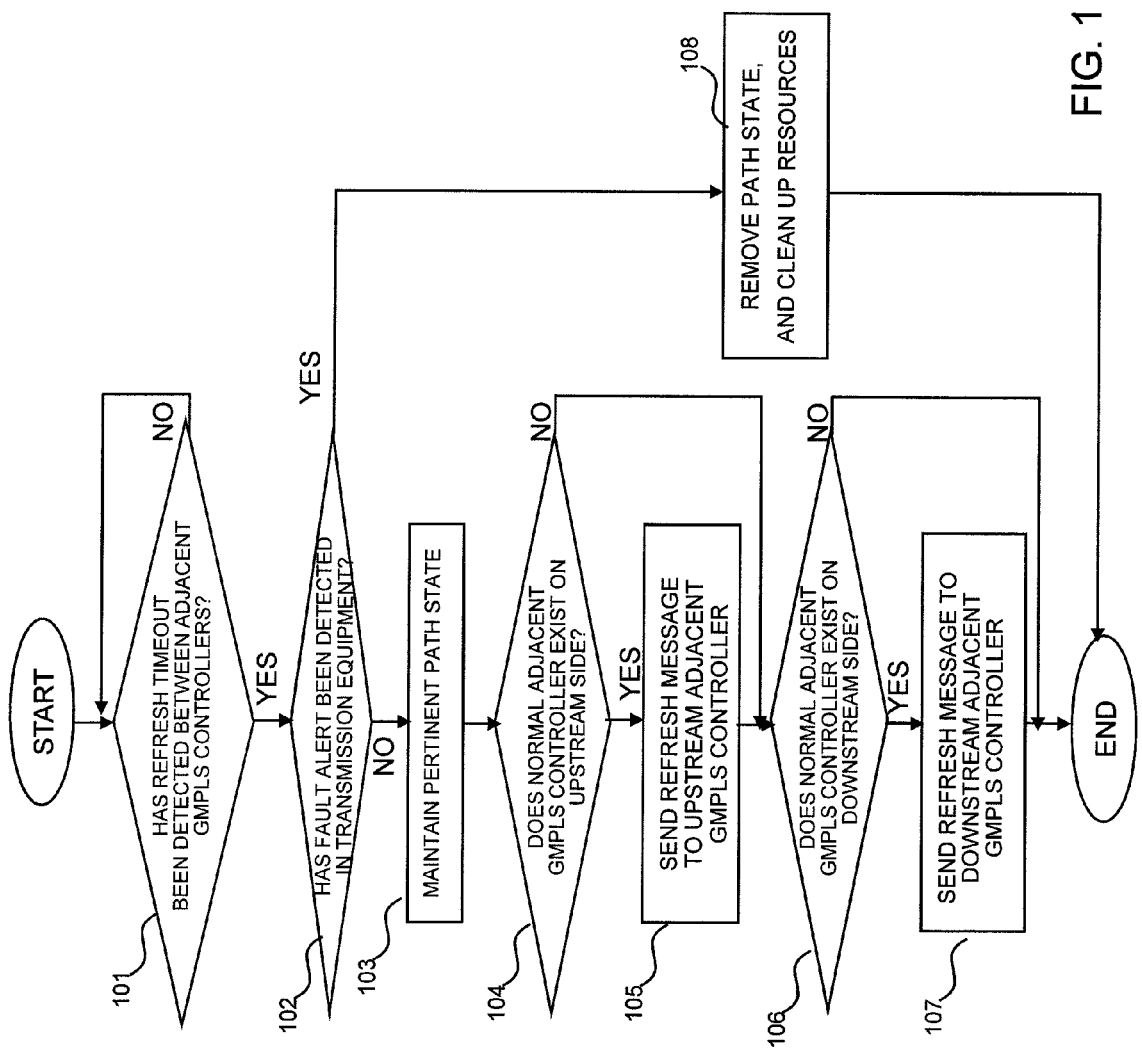
FIG. 1 is a flow chart representing the operation of an embodiment.

FIG. 1 is a flow chart representing the operation of this embodiment.

The GMPLS control portion 61 of each GMPLS controller executes the flow chart with reference to the memory 62, etc.

Figure 3:
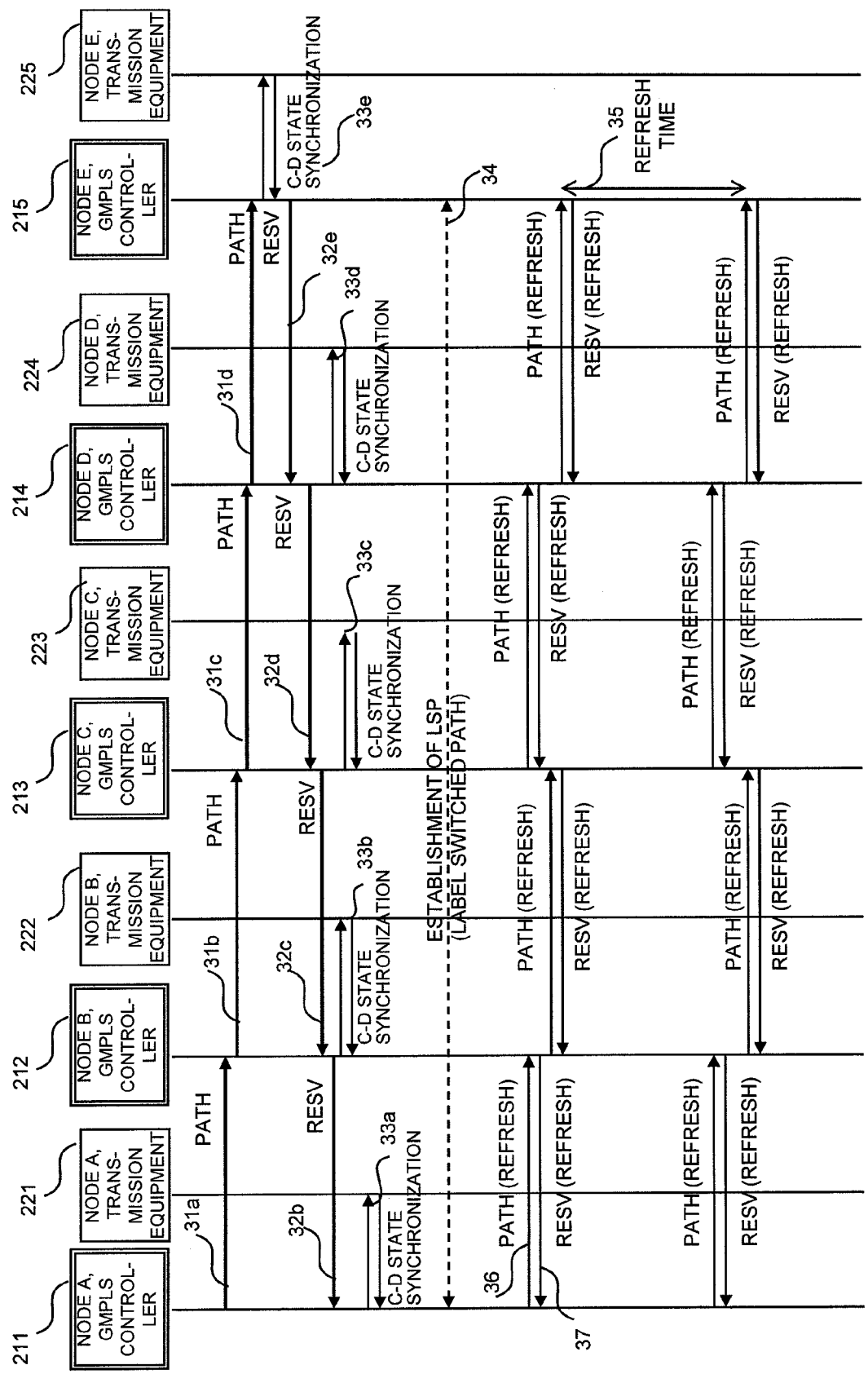
FIG. 3 is a message sequence diagram showing state maintenance which is made by an RSVP refresh message.
Figure 4:
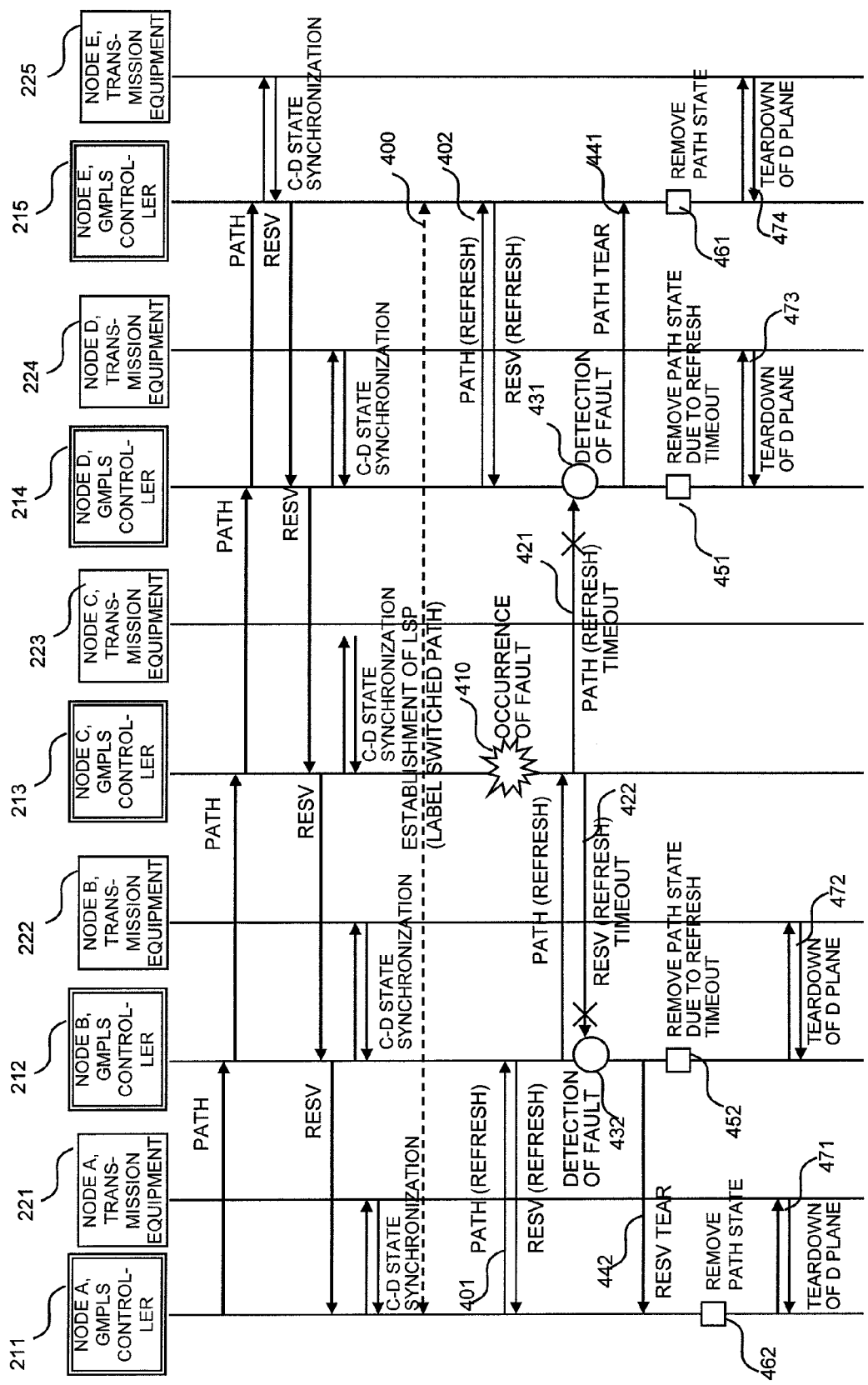
FIG. 4 is a sequence diagram of an RSVP-TE message at the fault of a GMPLS controller.
Figure 5:
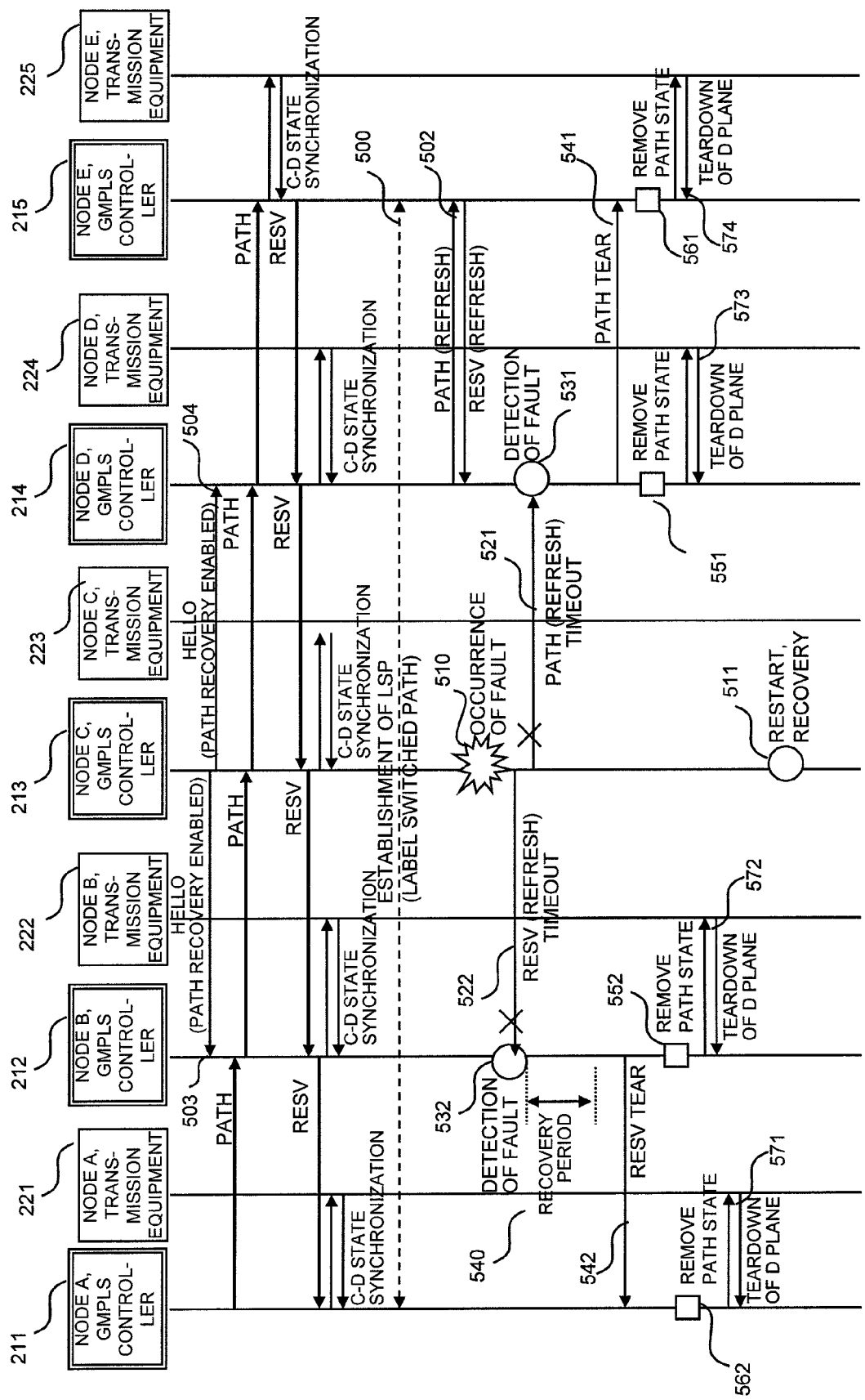
FIG. 5 is a sequence diagram of an RSVP-TE message at the fault of the GMPLS controller which has a graceful restart function.

In the GMPLS network in which the data plane for communicating user data, and the control plane for managing a data forwarder are configured of different media, in a case where a refresh operation for maintaining a path state is performed by exchanging "Path" messages at fixed time intervals among, for example, the GMPLS controllers A 211, B 212, C 213, D 214 and E 215 of the adjacent nodes, the GMPLS control portion 61 of each GMPLS controller detects a control plane fault (101) upon detecting a refresh timeout or by referring to an adjacent node state table. When the GMPLS control portion 61 detects the fault of an adjacent node, it checks if a fault signal has been detected in the transmission equipment of its own node (102). In a case where the GMPLS control portion 61 has not detected the fault signal in the transmission equipment of its own node and where the fault is limited to the control plane, it maintains the pertinent path state (103). Subsequently, the GMPLS control portion 61 sends the refresh messages to the normal node when the normal adjacent GMPLS controller exists in adjacency on the side opposite to the GMPLS controller of the adjacent node suspected to be faulty. That is, when the normal GMPLS controller exists on the upstream side (104), the GMPLS control portion 61 sends the refresh message to maintain the path state with the adjacent node (105). Further, when the normal GMPLS controller exists on the downstream side (106), the GMPLS control portion 61 sends the refresh message to maintain the path state with the adjacent node (107). As the refresh messages on this occasion, as shown in FIG. 3 by way of example, the "Path" message 36 is sent to the downstream side, and the "Resv" message 37 is sent to the upstream side. On the other hand, in a case where the fault signal has been detected in the transmission equipment of the pertinent node at the step 102, the GMPLS control portion 61 removes the entries of the pertinent path state from the path state table and cleans up the resources (108).

Further, when the GMPLS controller on the control plane has recovered from the fault, the GMPLS control portion 61 acquires path state information items from the adjacent nodes and recovers the path state without tearing down the data plane, in accordance with the graceful restart.

1-3. Sequence (Fault of Controller)

1-3-1. Occurrence of Fault

Figure 13:
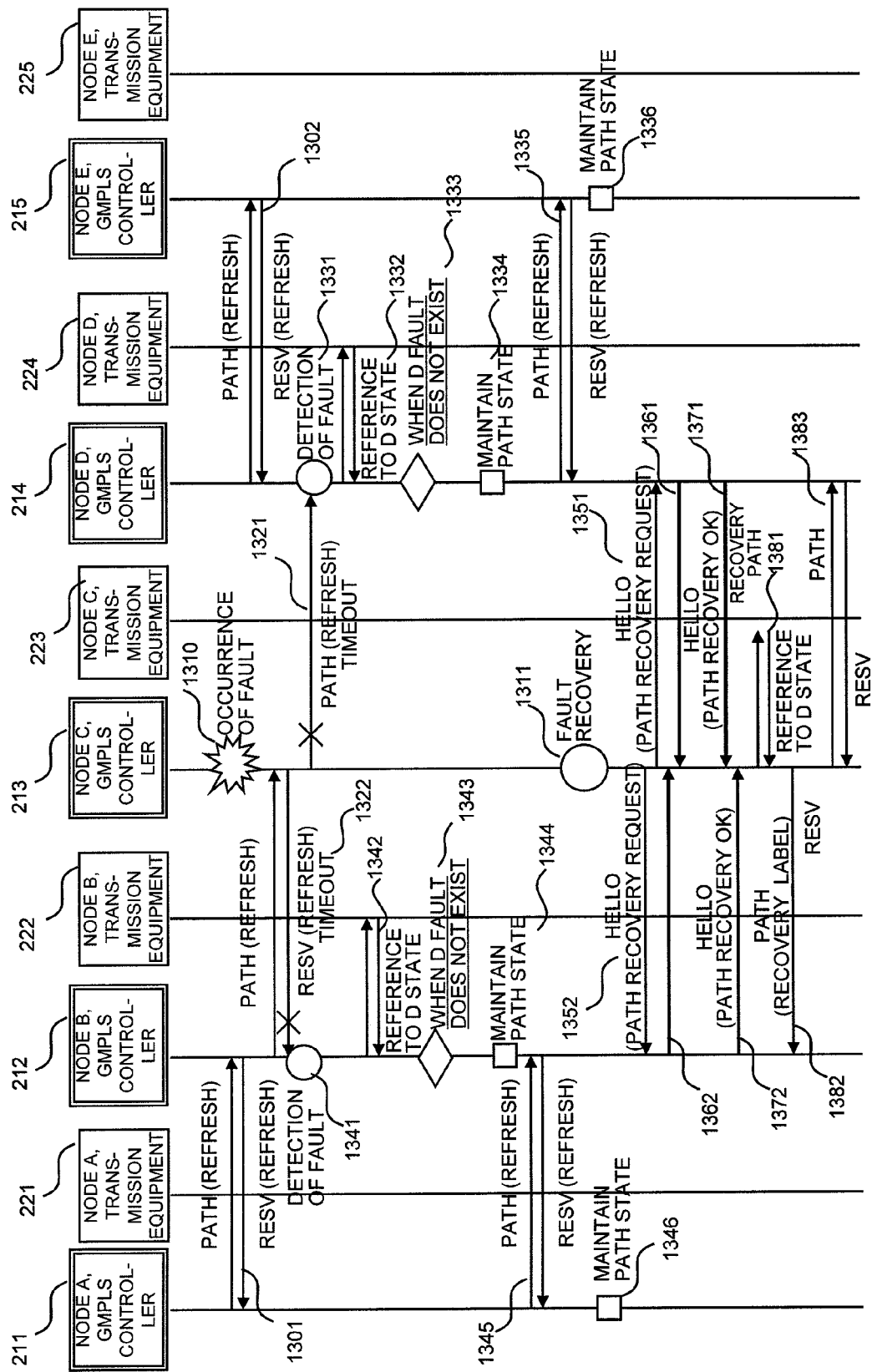
FIG. 13 is a message sequence diagram in the case where, in the first embodiment, the GMPLS controller C 213 has a fault without any fault in a data plane.

FIG. 13 is a message sequence diagram in the case where, in the first embodiment, the GMPLS controller C 213 has a fault without any fault in the data plane. The figure represents, for example, the case of the fault occurrence 1310 after the LSP establishment 34 in FIG. 3.

Figure 19:
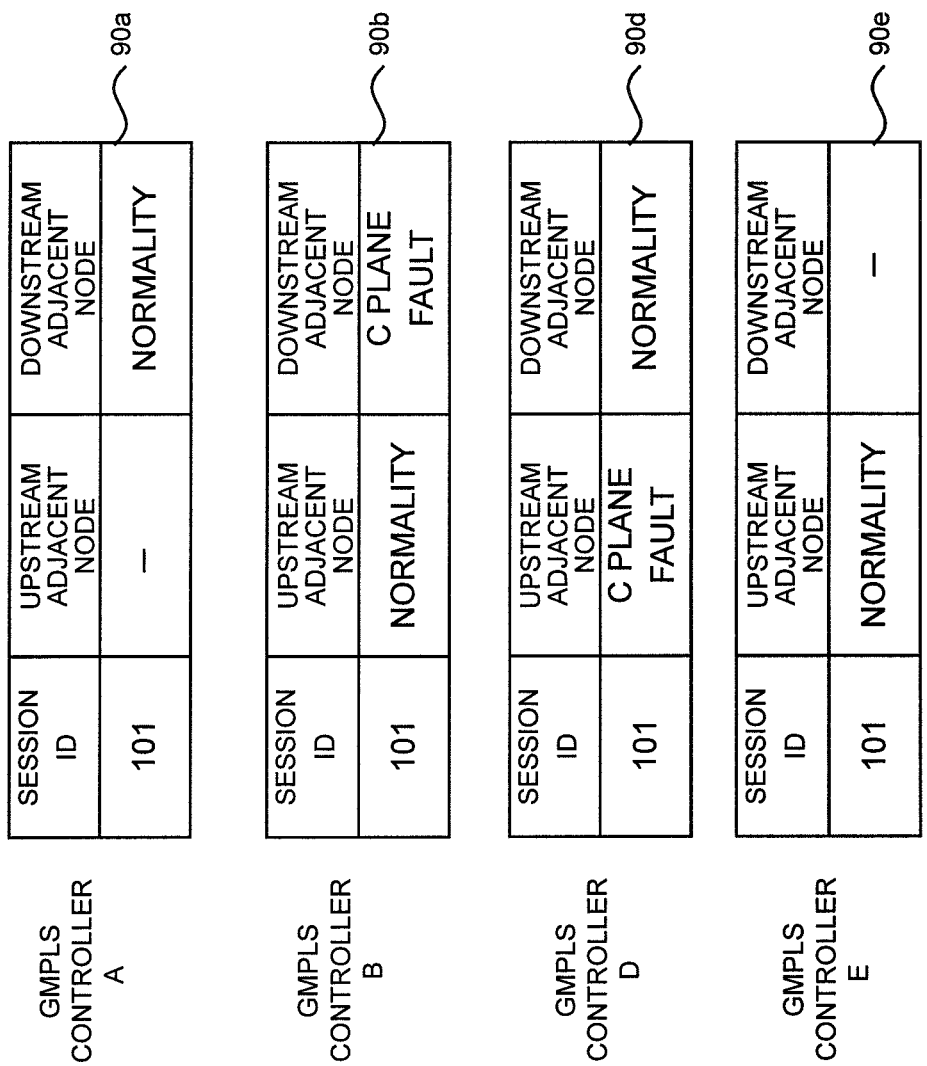
FIG. 19 is a diagram for explaining the adjacent node state table at the fault occurrence of the GMPLS controller C in the first embodiment.
Figure 20:
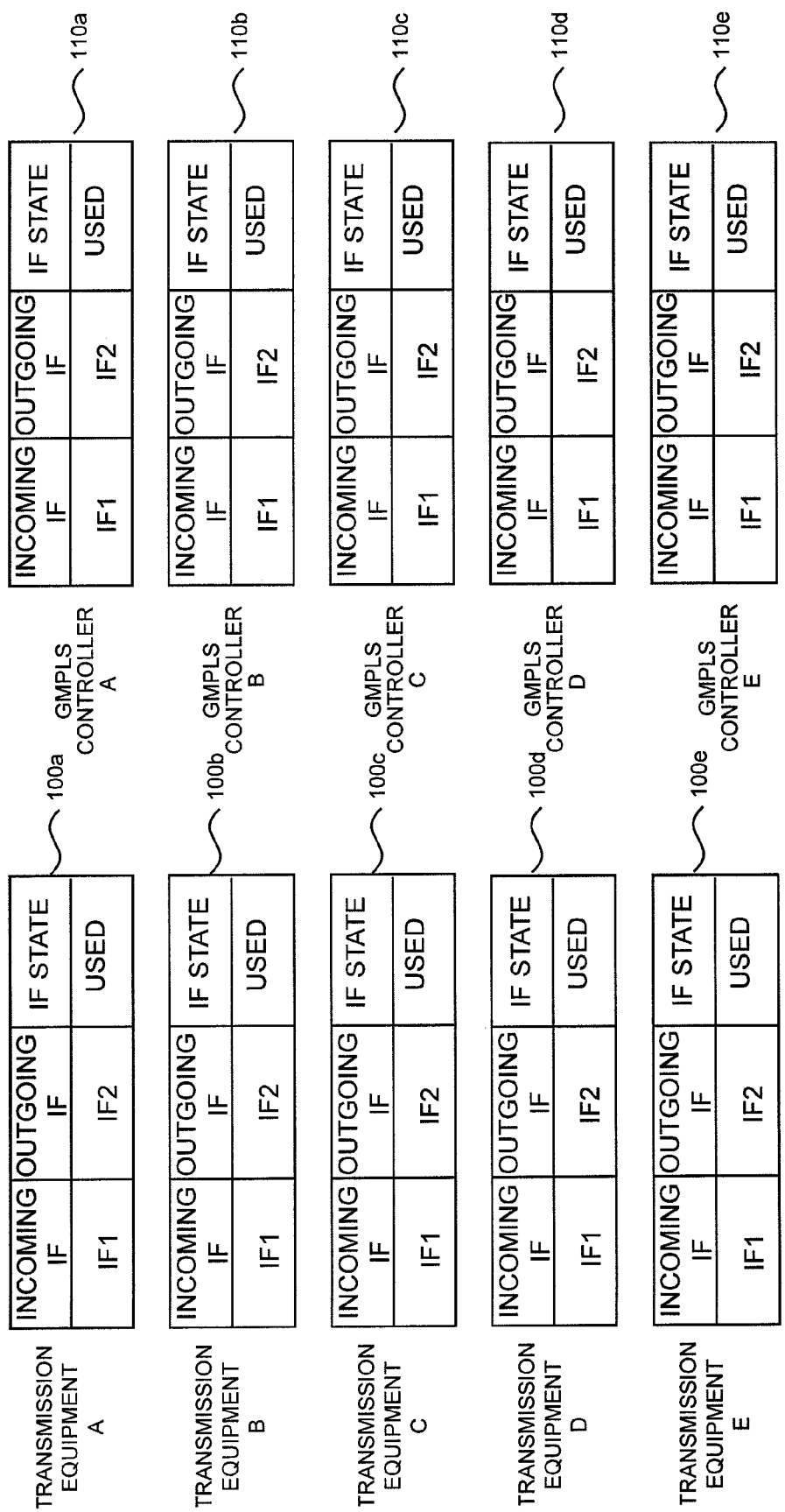
FIG. 20 is a diagram for explaining the switch state table of the transmission equipment and the IF state table of the GMPLS controller, at the fault occurrence of the GMPLS controller C in the first embodiment.

FIGS. 14, 15, 16 and 17 represent respective state tables at the times of the LSP establishment 34 in FIG. 3. FIGS. 18, 19 and 20 represent state tables in the cases where, after the fault occurrence 1310 of the GMPLS controller C 213 in FIG. 13, the GMPLS controllers D 214 and B 212 of the adjacent nodes have detected the fault of the GMPLS controller C 213 at 1331 and 1341 by the refresh timeouts 1321 and 1322, respectively.

At the LSP establishment (34), there are established, for example, path states which have an ingress at the IF "2" (2212) of the transmission equipment A 221, and whose egress is the IF "1" (2251) of the transmission equipment E 225, through the IF "1" (2221) and IF "2" (2222) of the transmission equipment B 222, the IF "1" (2231) and IF "2"

(2232) of the transmission equipment C 223, and the IF "1" (2241) and IF "2" (2242) of the transmission equipment D 224.

Now, the individual state tables at the LSP establishment will be described.

FIG. 14 is a diagram for explaining the path state table at the time of the LSP establishment in the first embodiment.

The path state tables 80a, 80b, 80c, 80d and 80e which are respectively managed in the individual GMPLS controllers A 211, B 212, C 213, D 214 and E 215 on this occasion, are shown in the figure. By way of example, the figure shows the states of the LSP which is identified by session ID=101 and which passes through hops "192.168.99.1, 192.168.99.2, 192.168.99.3, 192.168.99.4, and 192.168.99.5".

FIG. 15 is a diagram for explaining the adjacent node table at the LSP establishment in the first embodiment.

The figure shows the adjacent node tables 90a, 90b, 90c, 90d and 90e which are respectively managed in the individual GMPLS controllers A 211, B 212, C 213, D 214 and E 215. All of the respective adjacent node states are normal because these states are immediately after the RSVP-TE messages have been exchanged to establish the LSPs.

FIG. 16 is a diagram for explaining the switch state table of the transmission equipment at the LSP establishment in the first embodiment.

The figure shows the switch state tables 100a, 100b, 100c, 100d and 100e in the respective equipments A 221, B 222, C 223, D 224 and E 225 at the LSP establishment. All of the IF states are the reserved states because these states are immediately after the LSP establishment.

FIG. 17 is a diagram for explaining the IF state table which is managed in the GMPLS control portion, at the LSP establishment in the first embodiment.

The same states as in FIG. 16 are set for the reason that the transmission equipments A 221, B 222, C 223, D 224 and E 225 which correspond respectively to the GMPLS controllers A 211, B 212, C 213, D 214 and E 215 are synchronized.

Next, there will be described the individual state tables at the occurrence of the fault of the GMPLS controller.

The respective state tables at the fault detections (1331, and 1341) in FIG. 13 are as shown in FIGS. 18, 19 and 20.

FIG. 18 is a diagram for explaining the path state table at the fault occurrence of the GMPLS controller C in the first embodiment.

The diagram shows the path states of the individual GMPLS controllers A 211, B 212, D 214 and E 215, and the path state table 80c of the GMPLS controller C 213 cannot be referred to because the GMPLS control portion is faulty.

FIG. 19 is a diagram for explaining the adjacent node state table at the fault occurrence of the GMPLS controller C in the first embodiment.

The figure shows the states of the respective adjacent nodes of the individual GMPLS controllers A 211, B 212, D 214 and E 215. The GMPLS controller B 212 has detected the refresh timeout (1322) between it and the adjacent node GMPLS controller C 213 and has detected the fault (1341), so that it sets the downstream adjacent node state of the adjacent node state table 90b as the "control plane fault". Likewise, the GMPLS controller D 214 has detected the refresh timeout (1321) between it and the adjacent node GMPLS controller C 213 and has detected the fault (1331), so that it sets the upstream adjacent node state of the adjacent node state table 90d as the "control plane fault".

FIG. 20 represents a diagram for explaining the switch state table of the transmission equipment and the IF state table of the GMPLS controller, at the fault occurrence of the GMPLS controller C in the first embodiment.

On this occasion, any abnormality has not occurred in the transmission equipment A 221, B 222, C 223, D 224 or E 225 of the data plane. Therefore, the switch state tables 100a, 100b, 100c, 100d and 100e are all in the states of "being used".

In accordance the state tables as stated above, the individual GMPLS controllers execute processes as stated below.

Since the GMPLS controller C 213 is faulty, the transmission equipment C 223 maintains the pertinent path as it is.

The GMPLS controller D 214 executes the process in accordance with the flow of FIG. 1 after the detection (101 and 1331) of the fault of the GMPLS controller C 213. This GMPLS controller D 214 checks the state of the transmission equipment D 224 (written as the "reference to the data plane state" below) (102 and 1332) and is using the switch state table 100d (or the IF state table 110d) by, for example, the state reference notice 1241 and the state report notice 1251, so that it maintains the pertinent path (103 and 1334). Besides, the GMPLS controller D 214 may well check the IF states by using, for example, the IF state table 110 managed by the GMPLS controller D 214 as is synchronized with the switch state table 100. The GMPLS controller D 214 has the abnormal GMPLS controller C 213 in upstream adjacency thereto. That is, since any normal GMPLS controller does not exist in upstream adjacency (104), the GMPLS controller D 214 does not send the refresh message to upstream adjacency. Besides, since the normal GMPLS controller E 215 exists in downstream adjacency (106), the GMPLS controller D 214 sends the refresh message to the GMPLS controller E 215 (107 and 1335).

The GMPLS controller E 215 maintains the path states with the adjacent nodes (1336) without regard to the fault of the upstream GMPLS control portion.

The upstream GMPLS controller B 212 of the faulty node C 213 similarly executes the process in accordance with the flow of FIG. 1 after the detection (101 and 1341) of the fault of the GMPLS controller C 213. The GMPLS controller B 212 checks the state of the transmission equipment B 222 (the "reference to the data plane state") (102 and 1342) and is using the switch state table 100b (or the IF state table 110b) by, for example, the state reference notice 1241 and the state report notice 1251, so that it maintains the pertinent path (103 and 1334). Besides, the GMPLS controller B 212 may well check the IF states by using, for example, the IF state table 110 managed by the GMPLS controller B 212 as is synchronized with the switch state table 100. Since the GMPLS controller B 212 has the normal GMPLS controller A 211 in upstream adjacency (104), the GMPLS controller B 212 sends the refresh message to the GMPLS controller A 211 (105 and 1345). Also, since any normal GMPLS controller does not exist in downstream adjacency (106), the GMPLS controller B 212 does not send the refresh message to downstream adjacency.

The GMPLS controller A 211 maintains the path states with the adjacent nodes (1346) without regard to the fault of the downstream GMPLS control portion.

Thus, in the case where the fault has occurred in the GMPLS controller A 211, B 212, C 213, D 214 or E 215 of the control plane and where no fault has occurred in the data plane, the path states can be maintained without tearing down the data channel 22 used.

1-3-2. Recovery

Further, there will be described the recovery of path states at the time when the GMPLS controller C 213 has recovered (1311) from the fault.

When the GMPLS controller C 213 has recovered (1311) from the fault, it sends "Hello" messages (with path recovery requests) 1351 and 1352 to the adjacent nodes, thereby to notify the recovery from the fault and to make requests for the recovery of the paths. In the first embodiment, the path states are maintained in the adjacent nodes (1334 and 1344) irrespective of the recovery periods of the faulty nodes. Therefore, as the process after the fault recovery of the GMPLS controller C 213, the adjacent nodes execute "Hello" message acknowledgments (path recovery enabled) 1361 and 1362 to the path recovery requests, respectively, by utilizing the graceful restart scheme stated in Non-patent Documents 1 and 3.

The downstream adjacent GMPLS controller D 214 resends the information of the "Path" message which the GMPLS controller C 213 had sent to this GMPLS controller D before the fault, by a recovery "Path" message 1371. That is, the GMPLS controller D 214 sends the GMPLS controller C 213 the session ID, incoming label and other path property of the entry which has the hop 192.168.99.3 of the GMPLS controller C 213 as the previous hop, among the entries retained in the path state table 80*d*. These correspond to the session ID, next hop address, outgoing label and other path property of the path state table 80*c* of the GMPLS controller C 213.

Besides, the upstream adjacent GMPLS controller B 212 returns the state of a path owned jointly with the GMPLS controller C 213, by a "Path (Recovery_Label")" message 1372. That is, the GMPLS controller B 212 selects the entry which has the hop 192.168.99.3 controlled by the GMPLS controller C 213, as the next hop, among the entries of the path state table 80*b*, and it sends the "Path (Recovery_Label)" message 1372 which bears the session ID, outgoing label and other property, to the GMPLD controller C 213. These correspond to the session ID, previous hop address, incoming label and other path property in the path state table 80*c* of the GMPLS controller C 213.

Further, the GMPLS controller C 213 inquires of the transmission equipment C 223 about the switch state (1381). As a concrete example, the GMPLS controller C 213 issues the state reference notice 1241 (FIG. 12) to the transmission equipment C 223. The transmission equipment C 223 sends the state report notice 1251 to the GMPLS controller C 213 with reference to the switch state table 100*c* of the transmission equipment C 223 in FIG. 20. Thus, as shown in FIG. 20, the GMPLS controller C 213 adds the entries of the incoming IF=IF1, the outgoing IF=IF2 and the IF state=being used, into the IF state table 110*c*. Since the combination of the "incoming IF and outgoing IF" being used is "IF1 and IF2", IF1 and IF2 are respectively set in the items of the incoming IF and outgoing IF of the bus state table 80*c*, whereby the path state table 80*c* before the fault can be recovered.

In addition, the GMPLS controller C 213 recovers its state and sends the "Resv" message 1382 to the GMPLS controller A 221 of the upstream adjacent node.

Thus, the GMPLS controller C 213 can recover its path state without reassigning the resources or tearing down the path.

1-4. Sequence Diagram (Faults of Both Control Plane and Data Plane)

Next, there will be stated an example of a process in the case where the fault of the data plane has occurred together with the fault of the control plane.

Figure 21:
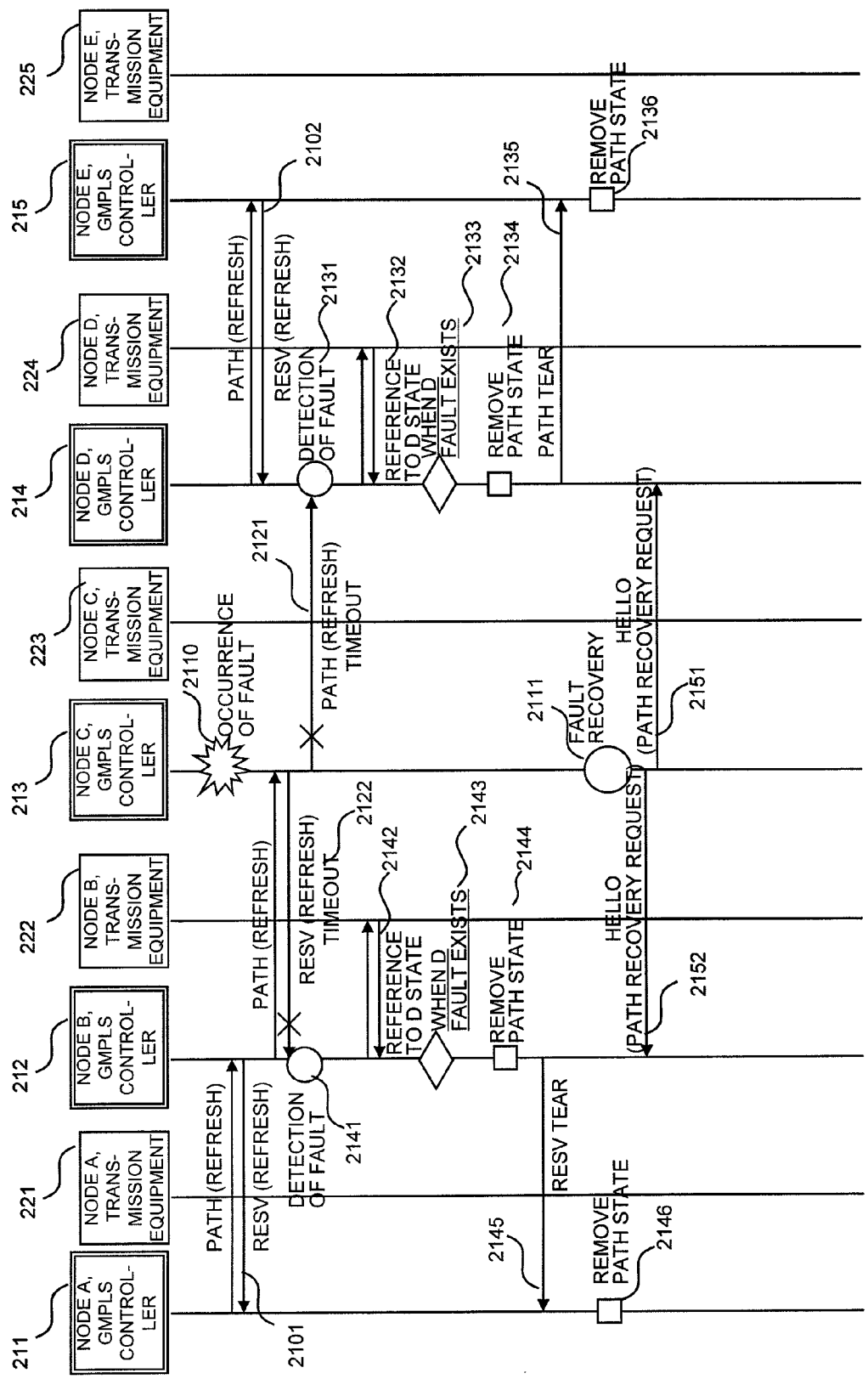
FIG. 21 is a message sequence diagram in the case where a data plane fault exists, at the fault of the GMPLS controller in the first embodiment.

FIG. 21 is a message sequence diagram in the case where the data plane fault exists, at the fault of the GMPLS controller in the first embodiment.

By way of example, the figure represents a message sequence at the time when the fault has occurred in the GMPLS controller C 213, and further, the fault has occurred in the transmission equipment C 223 of the data plane.

As stated above, the fault occurs (2110) in the GMPLS controller C 213, and the refresh timeouts are respectively detected (2121 and 2122) in the GMPLS controllers D 214 and B 212 of the adjacent nodes, thereby to detect (2131 and 2141) the abnormality of the GMPLS controller C 213.

Figure 22:
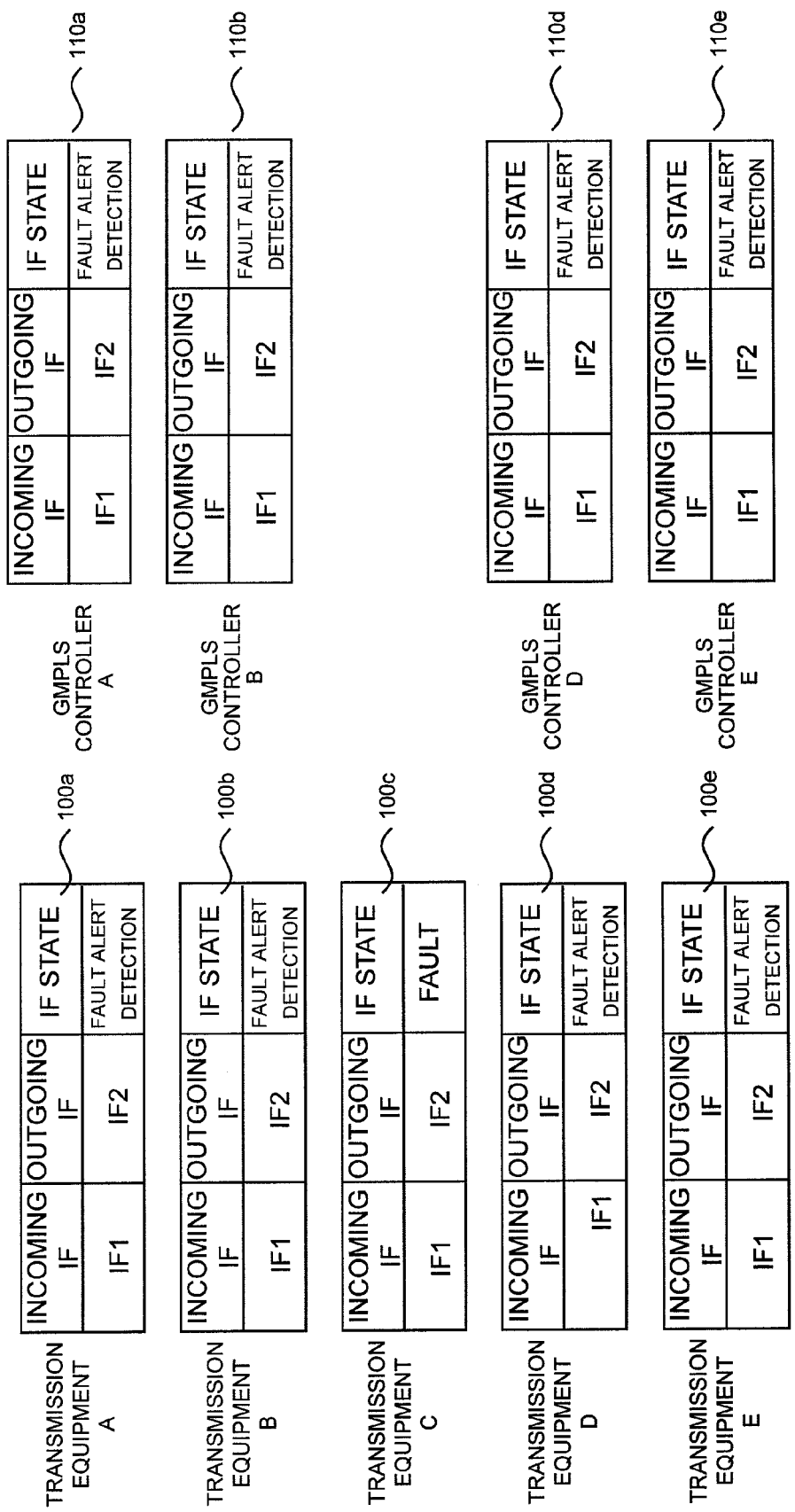
FIG. 22 is a diagram for explaining the switch state table of the transmission equipment at the time when the faults of the GMPLS controller C and the transmission equipment C in the first embodiment have occurred.

FIG. 22 is a diagram for explaining the switch state table of the transmission equipment at the time when the faults of the GMPLS controller C and the transmission equipment C in the first embodiment have occurred.

When the fault further occurs in, for example, the transmission equipment C 223 in such a state, the transmission equipments B 222 and D 224 of the adjacent nodes receive the fault signals as the individual input signals 7511 in the configuration of the transmission equipment shown in FIG. 7, and the individual fault administrators 7512 detect the fault and set the fault alert detection states in the switch state tables 100*b* and 100*d* of the transmission equipments B 222 and D 224, respectively. The transmission equipments A 221 and E 225 similarly receive the fault signals as the individual input signals 7511, and the individual fault administrators 7512 detect the fault, respectively. Then, the transmission equipments A 221 and E 225 set the fault alert detection states in the respective switch state tables 100*a* and 100*e*.

In accordance with the several state tables as stated above, the GMPLS controllers execute processes as stated below.

After the detection of the fault of the control plane (101 and 2131), the GMPLS controller D 214 executes the process in accordance with the flow of FIG. 1. The GMPLS controller D 214 checks the state of the transmission equipment D 224 (the "reference to the data plane state") (102 and 2132) by, for example, the state reference notice 1241 and the state report notice 1251. Since the switch state table 100*d* indicates the fault alert detection state, the entry 801 of the pertinent path state in the path state table 80*d* is removed, and the resources are cleaned up (108 and 2134). Besides, the GMPLS controller D 214 may well check the IF state by using, for example, the IF state table 110 which is managed by the GMPLS controller D 214 synchronized with the switch state table 100. In addition, the GMPLS controller D 214, for example, sends the path state alteration notice 1211 and sets the IF state of the switch state table 100*d* of the transmission equipment D 224 in the unused state. Besides, the GMPLS controller D 214 sends the "Pathtear" message 2135 to the downstream-node GMPLS controller E 215 and conveys the command of removing the path state.

Likewise, after the detection (101 and 2141) of the fault of the control plane, the GMPLS controller B 212 executes a process in accordance with the flow of FIG. 1. The GMPLS controller B 212 checks the state of the transmission equipment B 222 (the "reference to the data plane state") (102 and 2142) by, for example, the state reference notice 1241 and the state report notice 1251. Since the switch state table 100*b* indicates the fault alert detection state, the entry 801 of the pertinent path state in the path state table 80*b* is removed, and the resources are cleaned up (108 and 2144). Besides, the GMPLS controller B 212 may well check the IF state by using, for example, the IF state table 110 which is managed by the GMPLS controller B 212 synchronized with the switch state table 100. In addition, the GMPLS controller B 212, for example, sends the path state alteration notice 1211 and sets the IF state of the switch state table 100*b* of the transmission equipment B 222 in the unused state. Besides, the GMPLS controller B 212 sends the "Resvtear" message 2145 to the upstream-node GMPLS controller A 211 and conveys the command of removing the path state.

Thus, the resource leakage state in which the resources are held limitlessly can be prevented at the fault of the data plane.

2. Second Embodiment

A second embodiment is an example of a process which is involved in the communication fault of the control plane.

2-1. Network and Hardware Configuration

In the second embodiment, the network architecture shown in FIG. 2, the configuration of the GMPLS controller shown in FIG. 6, the configuration of the transmission equipment shown in FIG. 7, the formats of the individual state tables shown in FIGS. 8, 9, 10 and 11, and the state synchronization method for the GMPLS controller and the transmission equipment controller as shown in FIG. 12 are the same as in the first embodiment.

2-2. Flow Chart

A flow chart which the GMPLS controller 61 executes is the same as in the first embodiment.

2-3. Sequence (Communication Channel Fault of Control Plane)

The second embodiment differs from the first embodiment in that, unlike the fault of the GMPLS controller of the control plane, the fault has occurred on the communication channel of the control plane.

In the second embodiment, it is supposed by way of example that the fault has occurred in the communication interface portion 21*a* of the control plane of the GMPLS controller C 213.

Figure 23:
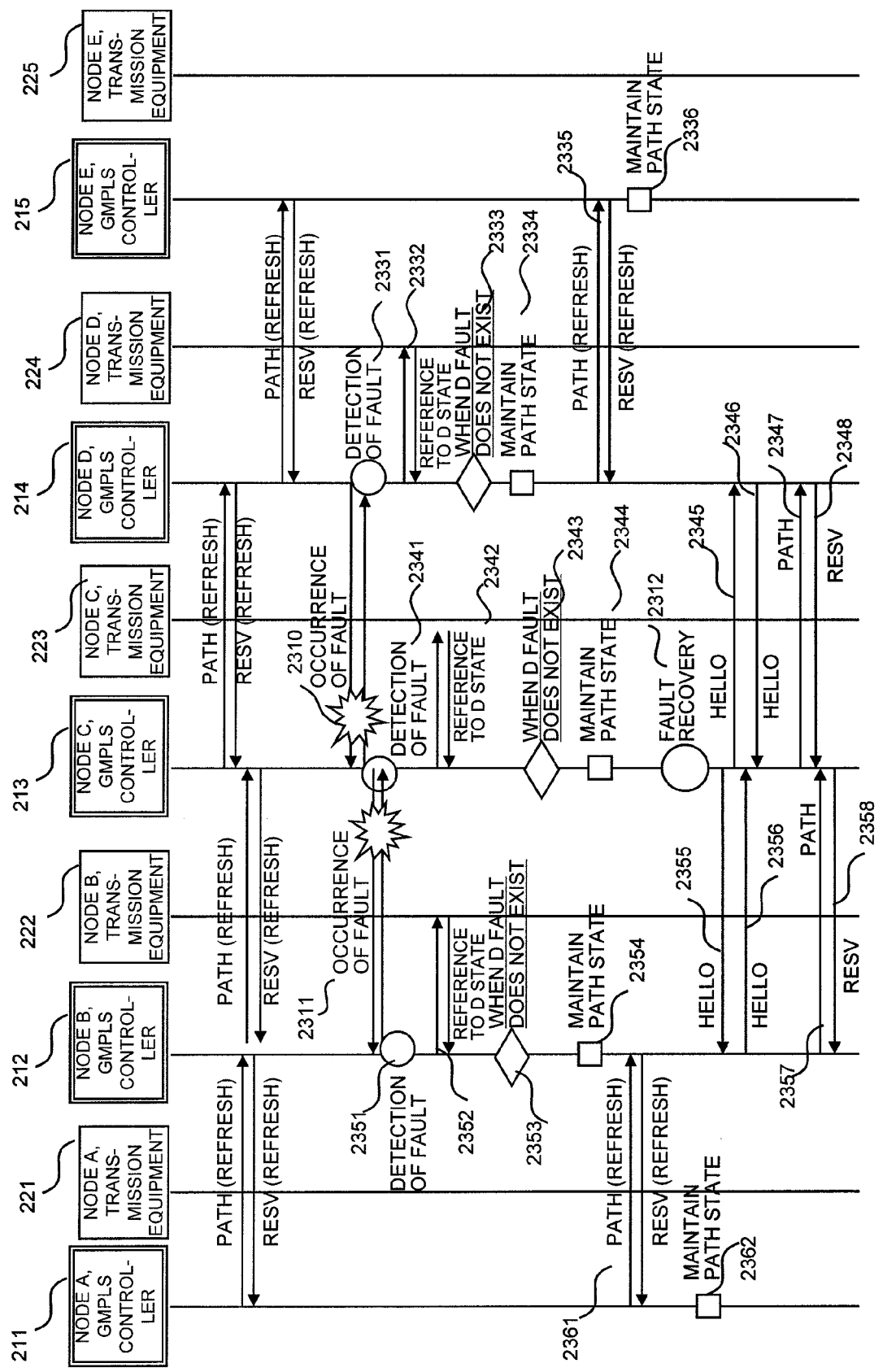
FIG. 23 is a message sequence diagram in the case of the communication fault of the control plane in a second embodiment.

FIG. 23 is a message sequence diagram in the case of the communication fault of the control plane in the second embodiment.

When the faults have occurred (2310 and 2311) in the communication interface portion 21*a* of the control plane of the GMPLS controller C 213, refresh timeouts are sensed in the GMPLS controllers D 214 and B 212 being the adjacent nodes, thereby to detect the abnormality of the GMPLS controller C 213 (2331 and 2351). The GMPLS controller C 213 grasps the abnormality as the abnormalities of the adjacent node GMPLS controllers D 214 and B 212, thereby to detect the fault (2341).

FIG. 24 is a diagram for explaining a path state table in the second embodiment.

FIG. 25 is a diagram for explaining an adjacent node state table in the second embodiment.

The respective diagrams represent the path state table and the adjacent node state table at this point of time.

In FIG. 25, the adjacent node state table 90*b* of the GMPLS controller B 212 is set as the C plane fault of the downstream adjacent node. Besides, the adjacent node state table 90*c* of the GMPLS controller C 213 is set as the C plane faults of the upstream and downstream adjacent nodes. In addition, the adjacent node state table 90*d* of the GMPLS controller D 214 is set as the C plane fault of the upstream adjacent node.

Figure 26:
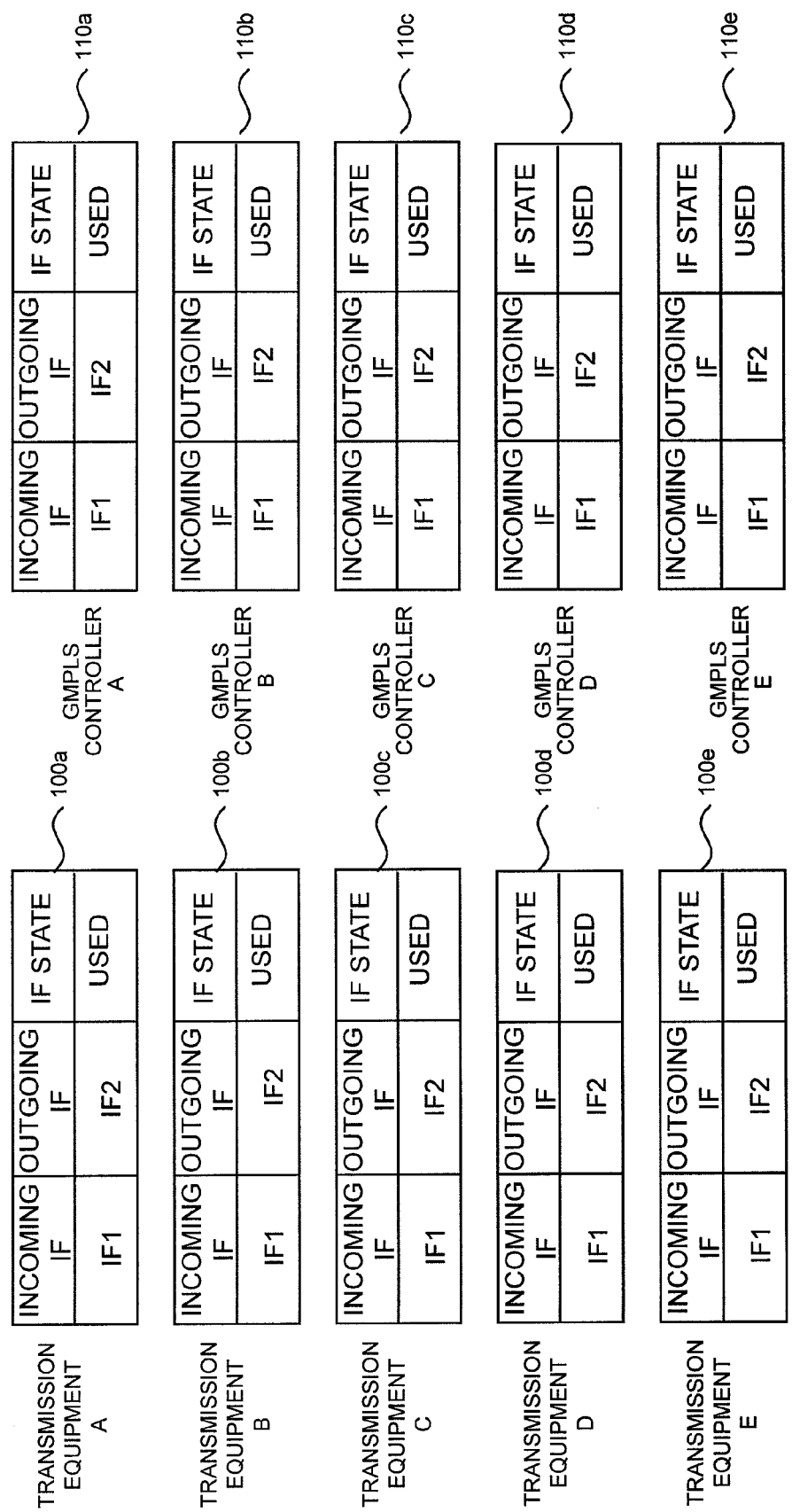
FIG. 26 is a diagram for explaining a switch state table in the second embodiment.

FIG. 26 is a diagram for explaining a switch state table in the second embodiment.

The figure shows the switch state table of the data-plane transmission equipment at the occurrence of the communication fault of the control plane. It is indicated that IF states are being used in all of the transmission equipments A 221, B 222, C 223, D 224 and E 225 (100*a*, 100*b*, 100*c*, 100*d* and 100*e*).

In the message sequence diagram of FIG. 23, the GMPLS controllers B 212, C 213 and D 214 having detected the faults of the control plane execute processes in accordance with the flow of FIG. 1 at the time points of fault detections (2351, 2341 and 2331), respectively.

When the GMPLS controller B 212 of the upstream node B has detected the fault of the control plane, it checks the state of the transmission equipment B 222 (written as the "reference to the data plane state" below) (102 and 2352) and is using the switch state table 100*b* by, for example, the state reference notice 1241 and the state report notice 1251, so that it maintains the pertinent path (103 and 2354). Besides, the GMPLS controller B 212 may well check the IF states by using, for example, the IF state table 110 managed by the GMPLS controller B 212 as is synchronized with the switch state table 100. Since the GMPLS controller B 212 has the normal GMPLS controller A 211 in upstream adjacency (104), the GMPLS controller B 212 sends the refresh message to the upstream adjacent GMPLS controller A 211 (105 and 2361). Also, since any normal GMPLS controller does not exist in downstream adjacency (106), the GMPLS controller B 212 does not send the refresh message to downstream adjacency.

When the GMPLS controller D 214 of the downstream node D has detected the fault of the control plane, it checks the state of the transmission equipment D 224 (the "reference to the data plane state") (102 and 2332) and is using the switch state table 100*d* by, for example, the state reference notice 1241 and the state report notice 1251, so that it maintains the pertinent path (103 and 2334). Besides, the GMPLS controller D 214 may well check the IF states by using, for example, the IF state table 110 managed by the GMPLS controller D 214 as is synchronized with the switch state table 100. Since the GMPLS controller D 214 has the abnormal GMPLS controller C 213 in upstream adjacency, that is, since it does not have any normal GMPLS controller in upstream adjacency (104), it does not send the refresh message to upstream adjacency. Besides, since the normal GMPLS controller E 215 exists in downstream adjacency (106), the GMPLS controller D 214 sends the refresh message to the downstream adjacent GMPLS controller E 215 (107 and 2335).

On the other hand, the GMPLS controller C 213 detecting the faults of both the adjacent nodes checks the state of the transmission equipment C 223 (the "reference to the data plane state") (102 and 2342) and is using the switch state table 100*c* by, for example, the state reference notice 1241 and the state report notice 1251, so that it maintains the pertinent path (103 and 2344). Besides, the GMPLS controller C 213 may well check the IF states by using, for example, the IF state table 110 managed by the GMPLS controller C 213 as is synchronized with the switch state table 100. Since both the adjacent nodes are faulty, the GMPLS controller C 213 does not send the refresh message. More specifically, since the GMPLS controller C 213 has the fault in upstream adjacency, that is, since it does not have any normal node in upstream adjacency (104), it does not send the refresh message to upstream adjacency. Further, since the GMPLS controller C 213 does not have any normal node in downstream adjacency, either (106), it does not send the refresh message to downstream adjacency, either.

When the fault of the communication interface portion 21*a* of the control plane in the GMPLS controller C 213 has recovered (2312), the recoveries of the adjacent GMPLS controllers B 212, C 213 and D 214 are respectively detected by the arrivals of "Hello" messages 2345, 2346, 2355 and 2356. Since, however, the respective GMPLS controllers B 212, C 213 and D 214 maintain the path state tables 80*b*, 80*c* and 80*d*, the recoveries of these path state tables are not performed.

As stated above, the flow of FIG. 1 can be applied, not only to the case of the fault of the GMPLS controller A 211, B 212, C 213, D 214 or E 215, but also to the case of the communication fault of the control plane, and the path state can be maintained without tearing down the data channel being used, when any fault does not occur in the data plane.

3. Third Embodiment

A third embodiment is an example of an aspect in which information on a faulty node is notified to the ingress node of a path.

3-1. Network and Hardware Configuration

In the third embodiment, the network architecture shown in FIG. 2, the configuration of the GMPLS controller shown in FIG. 6, the configuration of the transmission equipment shown in FIG. 7, the formats of the individual state tables shown in FIGS. 8, 9, 10 and 11, and the state synchronization method for the GMPLS controller and the transmission equipment controller as shown in FIG. 12 are the same as in the first embodiment. However, a management table to be stated below is added.

FIG. 29 is a diagram for explaining the fault management table in the third embodiment.

The GMPLS controller A 211 of a node A being the ingress node registers notified faulty node information in the illustrated fault management table 290. Besides, the node A can previously grasp the fact that its own node is the ingress, or the fact is previously set for the node A. The illustrated fault management table 290 is a table which is stored in, for example, the memory 62 of the GMPLS controller A 211, and which stores a node identifier 2901, and the information of the existence or nonexistence of the fault of a control plane 2902 or a data plane 2903

3-2. Flow Chart (Notices to Ingress Node)

The third embodiment differs from the first embodiment in that the GMPLS controller B 212, C 213 or D 214 in upstream adjacency to the faulty node, for example, sends a notice, a fault notice and a recovery notice concerning the faulty node of the GMPLS controller C 213, D 214 or E 215, to the ingress of a path.

Figure 28:
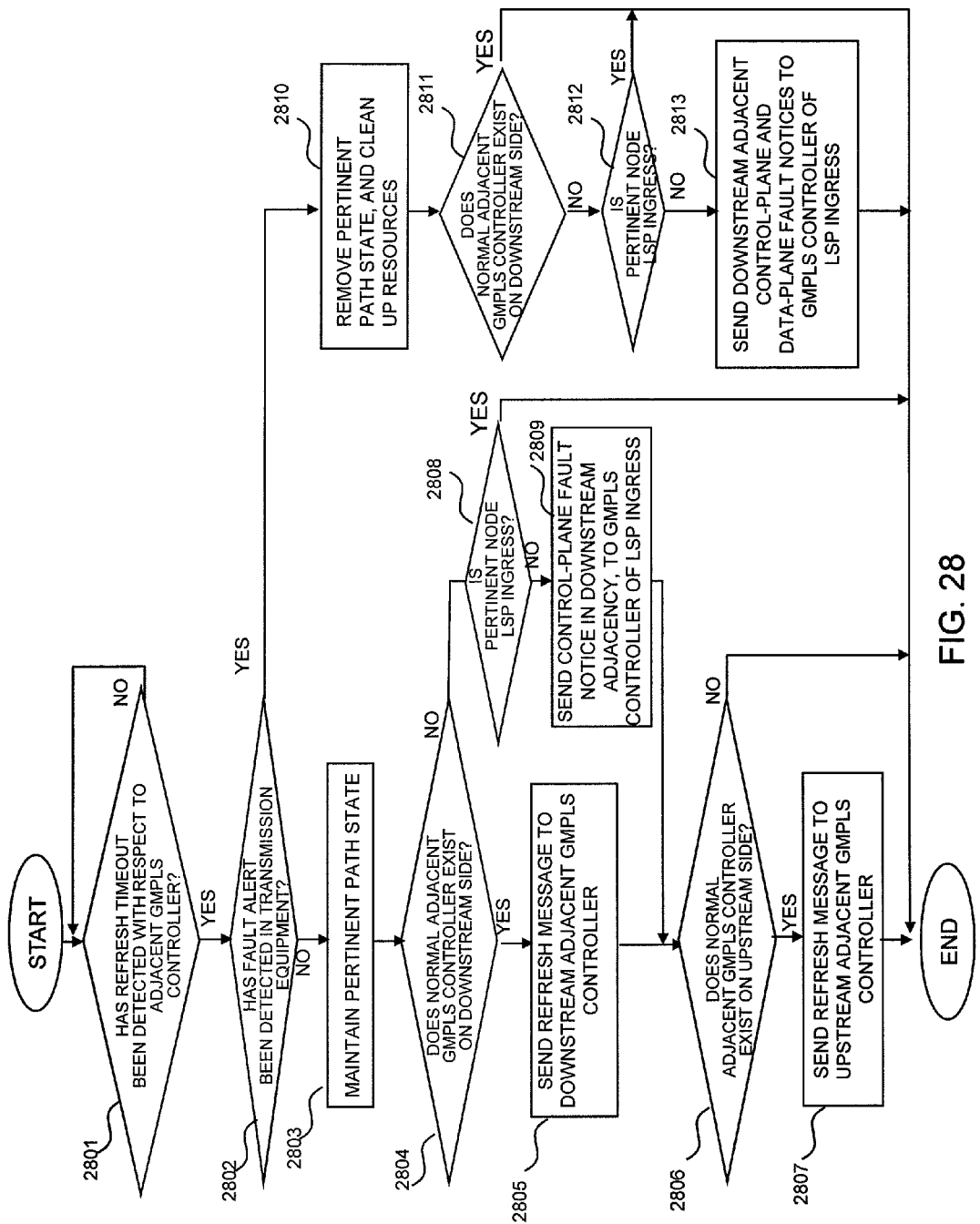
FIG. 28 is a flow chart at the time when a fault notice in the third embodiment is sent.

FIG. 28 shows a flow chart at the time when the fault notice in the third embodiment is sent.

The GMPLS control portion 61 of each GMPLS controller executes the flow chart with reference to the memory 62, etc.

As one of differences from the first embodiment, when a fault alert is not detected in, for example, the transmission equipment A 221, B 222, C 223, D 224 or E 225 of the node of the GMPLS control portion 61 itself (2802), this GMPLS control portion 61 judges whether or not the normal adjacent GMPLS controller B 212, C 213, D 214 or E 215 exists on a downstream side (2804). When the normal adjacent GMPLS controller does not exist, the GMPLS control portion 61 decides whether or not the node itself is the ingress of the LSP (2808). In addition, when the node itself is not the LSP ingress, the GMPLS control portion 61 sends the control-plane fault notice concerning downstream adjacency, to the GMPLS controller A 211 of the LSP ingress (2810). As the other difference from the first embodiment, in a case where the fault alert is detected in, for example, the transmission equipment A 221, B 222, C 223, D224 or E 225 of the node of the GMPLS control portion 61 (2802), this GMPLS control portion 61 decides whether or not its own node is ingress of the LSP (2812) when the normal adjacent GMPLS controller B 212, C 213, D 214 or E 215 does not exist on the downstream side (2811). When the pertinent node is not the LSP ingress, the GMPLS control portion 61 sends the data-plane fault notice concerning downstream adjacency, to the GMPLS controller A 211 of the LSP ingress (2813).

Now, the process will be described in detail with reference to the flow chart. First, when the GMPLS control portion 61 has detected the refresh timeout with respect to the adjacent GMPLS controller A 211, B 212, C 213, D 214 or E 215 (2801), it checks if the fault alert of the transmission equipment A 221, B 222, C 223, D 224 or E 225 of its own node is detected (2802). If the fault alert is detected in the transmission equipment A 221, B 222, C 223, D 224 or E 225 of the node of the GMPLS control portion 61, this GMPLS control portion 61 removes the pertinent path state and cleans up the resources (2810). Further, the GMPLS control portion 61 decides if the normal adjacent GMPLS controller B 212, C 213, D 214 or E 215 exists on the downstream side (2811). When such a normal adjacent GMPLS controller does not exist, the GMPLS control portion 61 decides whether or not its own node is the ingress of the LSP (2812). When the pertinent node is not the LSP ingress, the GMPLS control portion 61 sends control-plane and data-plane fault notices concerning downstream adjacency, to the GMPLS controller A 211 of the LSP ingress (2813). Besides, in a case where the normal adjacent GMPLS controller exists on the downstream side, at the step 2811, or where the pertinent node is the LSP ingress, at the step 2812, the GMPLS control portion 61 ends the process.

On the other hand, when the GMPLS control portion 61 does not detect the fault alert in the transmission equipment A 221, B 222, C 223, D 224 or E 225 of its own node, at the step 2802 (2802), it maintains the state of the pertinent path (2803), and it judges whether or not the normal adjacent GMPLS controller B 212, C 213, D 214 or E 215 exists on the downstream side (2804). When the normal adjacent GMPLS controller exists on the downstream side, the GMPLS control portion 61 sends the refresh message to the downstream adjacent GMPLS controller B 212, C 213, D 214 or E 215 (2805). On the other hand, when the normal adjacent GMPLS controller B 212, C 213, D 214 or E 215 does not exist on the downstream side, at the step 2804, the GMPLS control portion 61 decides whether or not its own node is the ingress of the LSP (2808). When the pertinent node is not the LSP ingress (2804), the GMPLS control portion 61 sends the control-plane fault notice concerning downstream adjacency, to the GMPLS controller A 211 of the LSP ingress (2809). Besides, when its own node is the LSP ingress at the step 2808, the GMPLS control portion 61 ends the process.

Further, when the normal adjacent GMPLS controller A 211, B 212, C 213 or D 214 exists on the upstream side, at the step 2806, the GMPLS control portion 61 sends the refresh message to the upstream adjacent GMPLS controller A 211, B 212, C 213 or D 214 (2807). When the normal adjacent GMPLS controller does not exist on the upstream side, the GMPLS control portion 61 does not send the refresh message.

Incidentally, whether or not the node of the GMPLS control portion itself is the ingress node, can be stored beforehand or determined every session by way of example. Besides, a method for sending the fault notice to the ingress node may well be incarnated in such a way, for example, that the address of the ingress node is stored in all the nodes beforehand, and that the fault notice is sent to the pertinent address at the detection of the fault. Also, the fault notice may well be sent to the ingress node in such a way, for example, that the fault notice is sent from the previous hop address stored in the path state table 80, to the upstream adjacent node, and that the upstream adjacent node having received the fault notice propagates this fault notice in an upstream direction similarly. In addition, the fault notice may well be given to the ingress node by any other appropriate method.

An egress node (for example, node E) does not have a downstream node. Therefore, it can be coped with in such a way that, in the flow chart of FIG. 28, the processing of branching to "yes" is added even in a case where the node of the GMPLS control portion is the LSP egress at each of the steps 2808 and 2812.

Besides, even in a case where the ingress node (for example, node A) has received dual fault notices, it may well be operated by an appropriate method, for example, which discards the later notice.

3-3. Sequence (Notice to Ingress Node: Control Plane Fault)

Figure 27:
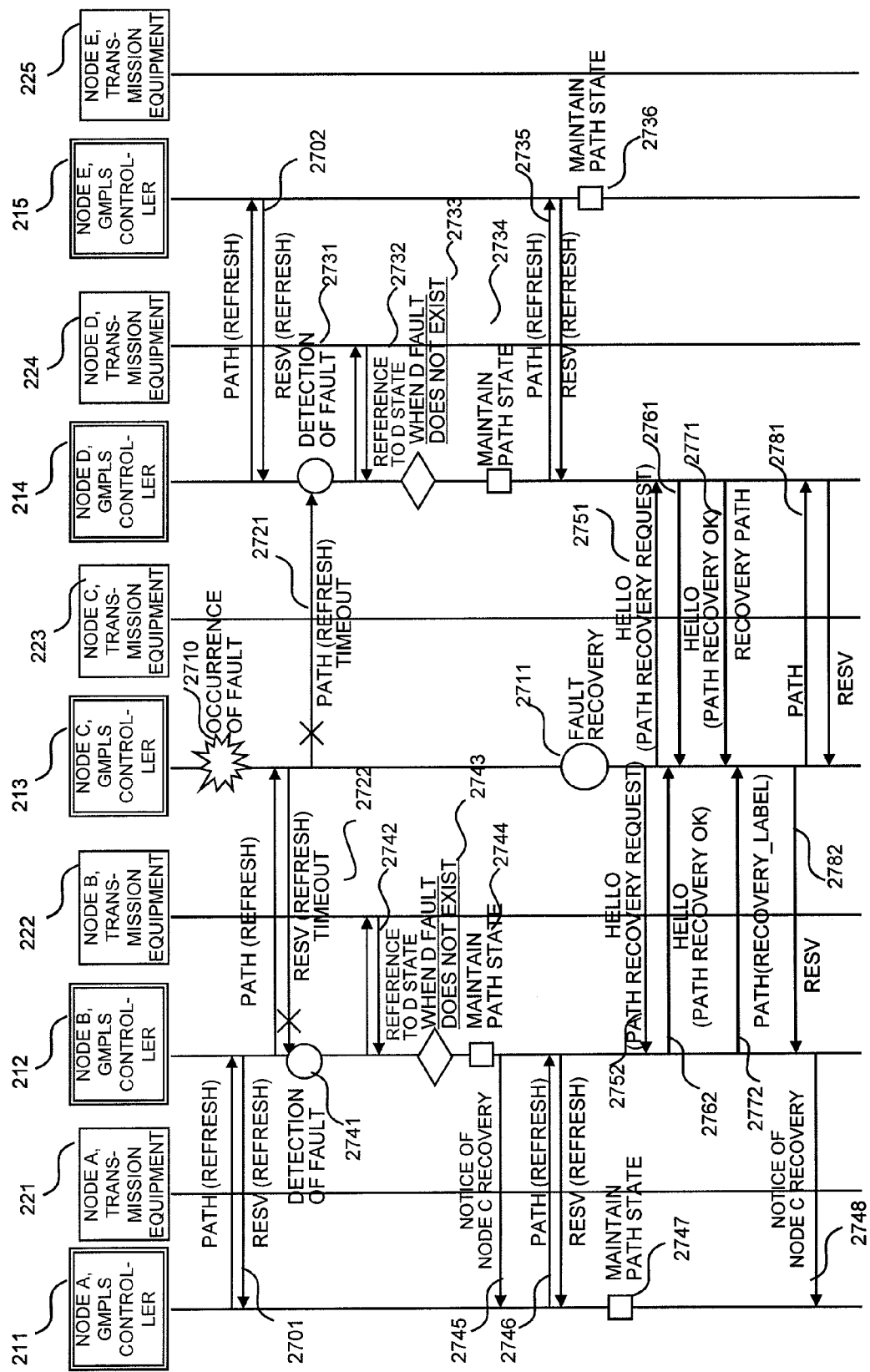
FIG. 27 is a message sequence diagram at the time when the fault 2710 of a control plane has occurred in a node C 213, in relation to a third embodiment.

FIG. 27 represents a message sequence diagram at the time when the fault 2710 of the control plane has occurred at the node C 213, in relation to the third embodiment.

The GMPLS controller D 214 executes a process in accordance with the flow of FIG. 28, after having detected the fault of the GMPLS controller C 213 (2801 and 2731). The GMPLS controller D 214 checks the state of the transmission equipment D 224 (written as the "reference to the data plane state" below) (2802 and 2732) and is using the switch state table 100*d* by the state reference notice 1241 and the state report notice 1251, so that it maintains the pertinent path (2803 and 2734). Besides, the GMPLS controller D 214 may well check the IF states by using, for example, the IF state table 110 managed by the GMPLS controller D 214 as is synchronized with the switch state table 100.

Since the GMPLS C 213 is faulty, the transmission equipment C 223 maintains the pertinent path as it is.

Since the GMPLS controller D214 has the normal GMPLS controller E 215 in downstream adjacency (2804), it sends a refresh message (2805 and 2735). On the other hand, the GMPLS controller D214 has the abnormal GMPLS controller C 213 in upstream adjacency. That is, any normal GMPLS controller does not exist in upstream adjacency (2806). Therefore, the GMPLS controller D214 does not send any refresh message to upstream adjacency.

The GMPLS controller E 215 maintains the path states with the adjacent nodes (2736) without regard to the fault of the upstream GMPLS control portion.

As stated above, the processes of the GMPLS controllers (in this example, D 214 and E 215) on the downstream side of the faulty node are the same as in the first embodiment. A difference from the first embodiment is the processes of the GMPLS controllers (in this example, A 211 and B 212) on the upstream side of the faulty node.

The upstream-side GMPLS controller B 212 of the faulty node C 213 similarly executes a process in accordance with the flow of FIG. 28 after having detected the fault of the GMPLS controller C 213 (2801 and 2741). The GMPLS controller B 212 checks the state of the transmission equipment B 222 ("reference to the data plane state") (2802 and 2742) and is using the switch state table 100*b* by, for example, the state reference notice 1241 and the state report notice 1251, so that it maintains the pertinent path (2803 and 2744). Besides, the GMPLS controller B 212 may well check the IF states by using, for example, the IF state table 110 managed by the GMPLS controller B 212 as is synchronized with the switch state table 100.

Since the GMPLS controller B 212 does not have any normal GMPLS controller in downstream adjacency (2804), it decides if its own node is an LSP ingress (2808). Since the pertinent node is not the ingress, the GMPLS controller B 212 sends the faulty node information of the downstream-adjacent GMPLS controller C 213 (2809 and 2745), to the GMPLS controller A 211 of the node A being the LSP ingress. Besides, the GMPLS controller B 212 does not send any refresh message to downstream adjacency. As shown in FIG. 29, the faulty node information contains, for example, a node identifier, the state of the control plane (such as being faulty or being used), and the state of the data plane (such as being faulty or being used). Also, the address of the node A may well be contained. Further, since the normal GMPLS controller A 211 exists in upstream adjacency (2806), the GMPLS controller B 212 sends the refresh message to the GMPLS controller A 211 (2807 and 2746).

Incidentally, the operations of the GMPLS controllers B 212, C 213 and D 214 at the time when the GMPLS controller C 213 has recovered from the fault (2711) are the same as in the first embodiment.

A difference from the first embodiment is that, after the GMPLS controller B 212 of the upstream adjacent node B of the GMPLS controller C 213 being the faulty node C has sent a "Path (Recovery_Label)" message 2722, it sends the recovery notice 2748 of the node C to the ingress node A 211 when the GMPLS controller B 212 of the upstream adjacent node B has received the "Resv" message 2782 indicating the state recovery of the GMPLS controller C 213 of the node C. The ingress-node GMPLS controller A 211 discriminates the node identifier of the notified recovery notice, and alters the information "being faulty" of the control plane of the fault management table 290, into "being used".

Also in a case where a control-plane fault has occurred in the GMPLS controller D 214 of the node D, the GMPLS controller C 213 of the node C being the upstream adjacency of the faulty node can similarly notify the control-plane fault to the LSP ingress node A 211 in accordance with the flow for sending the fault notice as shown in FIG. 28.

3-4. Sequence (Notice to Data-Plane Ingress Node: Data Plane Fault)

Figure 30:
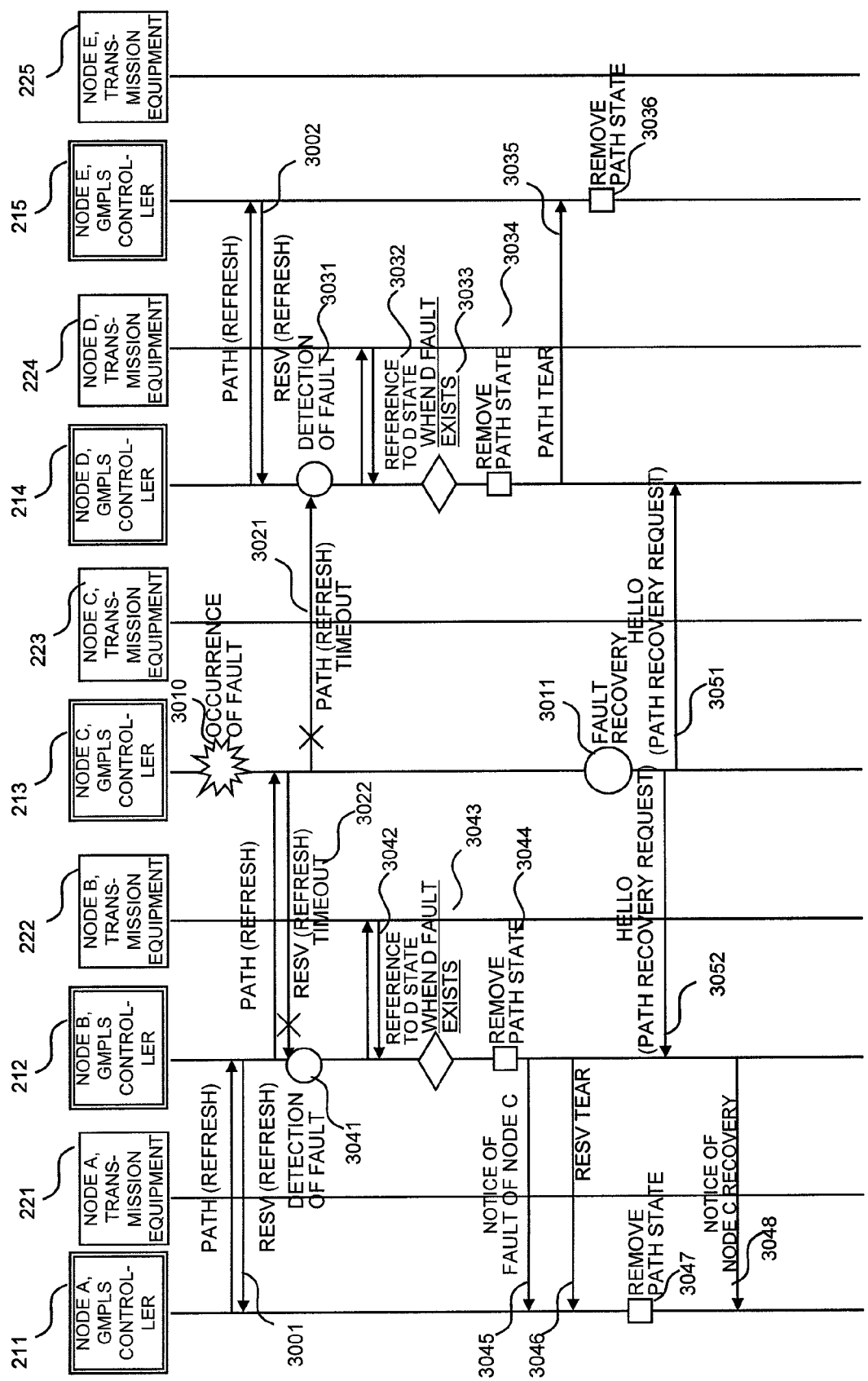
FIG. 30 is a message sequence diagram at the time when the fault 270 of a data plane has occurred in a node C 203, in relation to the third embodiment.
Figure 31:
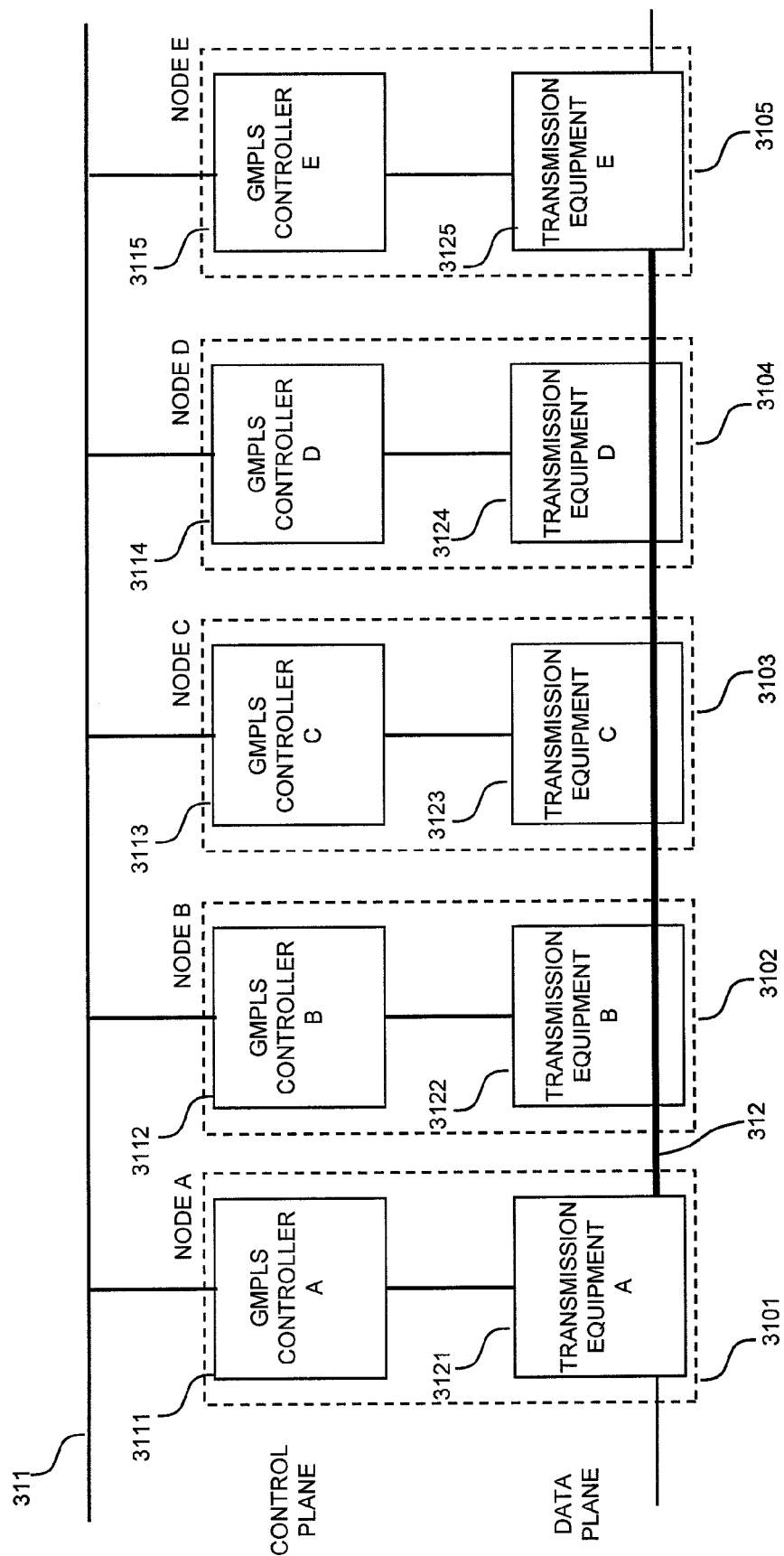
FIG. 31 is a configurational diagram of a network apparatus which is controlled by the GMPLS.

FIG. 30 shows a message sequence diagram at the time when the fault 270 of the data plane has occurred in the node C 203, in relation to the third embodiment.

The GMPLS controller D 214 executes a process in accordance with the flow of FIG. 28, after having detected (2801 and 3031) the fault of the control plane of the GMPLS controller C 213. The GMPLS controller D 214 checks the state of the transmission equipment D 224 ("reference to the data plane state") (2802 and 3032) by, for example, the state reference notice 1241 and the state report notice 1251, and the switch state table 100*d* is in a fault alert detection state, so that the GMPLS controller D 214 removes the entry 801 of the pertinent path state of the path state table 80*d* and cleans up the resources (2810 and 3034). Besides, the GMPLS controller D 214 may well check the IF states by using, for example, the IF state table 110 managed by the GMPLS controller D 214 as is synchronized with the switch state table 100. In addition, the GMPLS controller D 214 sends, for example, the path state alteration notice 1211, thereby to set the IF state of the switch state table 100*d* of the transmission equipment D 224 in an unused state. Besides, the GMPLS controller D 214 sends a "Pathtear" message to the downstream-node GMPLS controller E 215, thereby to convey the command of removing the path state (2035).

Likewise, the GMPLS controller B 212 executes a process in accordance with the flow of FIG. 28, after having detected the fault of the control plane of the GMPLS controller C 213 (2801 and 3041). The GMPLS controller B 212 checks the state of the transmission equipment B 222 ("reference to the data plane state") (2802 and 3042) by, for example, the state reference notice 1241 and the state report notice 1251, and the switch state table 100*b* is in the fault alert detection state, so that the GMPLS controller B 212 removes the entry 801 of the pertinent path state of the path state table 80*b* and cleans up the resources (2810 and 3044). Besides, the GMPLS controller B 212 may well check the IF states by using, for example, the IF state table 110 managed by the GMPLS controller B 212 as is synchronized with the switch state table 100. Further, since the GMPLS controller B 212 does not have any normal adjacent GMPLS controller on the downstream side (2811), it decides whether or not its own node is the LSP ingress (2812). Since the node of the GMPLS controller B 212 is not LSP ingress, this GMPLS controller B 212 sends control-plane and data-plane fault notices 3045 of the downstream-adjacent GMPLS controller C 213 to the GMPLS controller A 211 of the LSP ingress (2813). In addition, the IF state of the switch state table 100b of the transmission equipment B 222 is set in the unused state in such a way, for example, that the GMPLS controller B 212 sends the path state alteration notice 1211 or that the transmission equipment B 222 itself works. Besides, the GMPLS controller B 212 sends a "Resvtear" message 3046 to the upstream-node GMPLS controller A 211, thereby to convey the command of removing the path state.

The GMPLS controller A 211 of the node A being the ingress node registers the notified fault node information in the fault management table 290 shown in FIG. 29. That is, the states of the control plane and the data plane of the node C are set as being faulty.

In a case where the node C has recovered (3011) from the fault, the GMPLS controller B 212 of the node B sends the recovery notice 3048 of the node C to the GMPLS controller A 211 of the LSP ingress when it has received the "Hello" message 3052 indicating the fault recovery. The GMPLS controller A 211 of the node A being the ingress node discriminates the node identifier of the notified recovery notice, and alters the information of being faulty of the control plane and/or the data plane, into the information of being used. When the faults of the control plane 2902 and the data plane 2903 have been both eliminated, the GMPLS controller A 211 removes the pertinent entry from the fault management table 290.

Thus, in establishing a new path, the ingress-node GMPLS controller A 211 can set a route while avoiding any faulty node. Further, when the ingress-node GMPLS controller A 211 has set any route including a faulty node, it can issue an alert so as to set a route which avoids the faulty node.

The present invention is applicable to techniques for managing paths in various networks such as the trunk network of an optical transmission apparatus, by employing GMPLS control technology. Besides, the embodiments of the invention are applicable, not only to GMPLS, but also to various communication techniques which transmit data from upstream to downstream.

What is claimed is:

1. A communication node comprising a transmission equipment which communicates user data with a transmission equipment of an adjacent node, and a controller which communicates a message with a controller of the adjacent node and which manages the transmission equipment of its own node, wherein:
  a controller of the node detects existence or nonexistence of a fault of a controller of the adjacent node on the basis of situation of receiving a message sent from the controller of the adjacent node;
  when the controller of the node detects the fault of the controller of the adjacent node, the controller of the node issues a state reference notice to a transmission equipment of its own node, acquires a state of an interface of the transmission equipment of its own node by receiving a state report notice to the state reference notice, and checks existence or nonexistence of fault alert detection which is included in the acquired state of the interface of the transmission equipment of its own node; and
  in a case where the fault alert detection of the transmission equipment of the node does not exist, the controller of the node maintains a path state of the node.

2. A communication node as defined in claim 1, wherein when a normal controller exists in the other adjacent node on an opposite side to the adjacent node having the controller whose fault has been detected, the controller of the node sends a message to the normal controller and maintains the path state with the other adjacent node.

3. A communication node as defined in claim 1, wherein, in case where the fault alert detection of the transmission equipment of the node exists, the controller of the node removes an entry of the path state in a path state table which is included in the controller of the node and which stores path states, and then cleans up resources.

4. A communication node as defined in claim 1, wherein when a normal controller exists in upstream, the controller of the node sends a refresh message to upstream and maintains the path state with the adjacent node, and when a normal controller exists in downstream, the controller of the node sends a refresh message to downstream and maintains the path state with the adjacent node.

5. A communication node as defined in claim 1, wherein the controller of the node performs a refresh operation in which the path state is maintained by exchanging "Path" messages at fixed time intervals, and the controller of the node detects the fault by detecting refresh timeout.

6. A communication node as defined in claim 5, wherein as the refresh message, a "Path" message is sent downstream, and a "Resv" message is sent upstream.

7. A communication node as defined in claim 1, wherein, when the controller of the adjacent node has recovered from the fault, the controller of the adjacent node acquires path state information from the other adjacent node in accordance with a graceful restart technique, and it recovers the path state without tearing the data plane.

8. A communication node as defined in claim 1, wherein:
  each of the controller of the adjacent node and the controller of the node includes:
    a path state table which stores a path state containing a previous hop address, a next hop address, an incoming interface (IF) identifier and an outgoing interface (IF) identifier, in correspondence with a session ID;
    an adjacent node state table which stores an adjacent node state containing a fault or normal state of an upstream adjacent node and a fault or normal state of a downstream adjacent node, in correspondence with the session ID; and
    an IF state table which stores a switch state of the transmission equipment as contains an incoming IF, an outgoing IF, and an IF state containing "being used" or "fault";
  each of the transmission equipment of the adjacent node and the transmission equipment of the node includes:
    a switch state table which stores the switch state of the transmission equipment as represents the incoming IF, the outgoing IF, and the IF state containing "being used" or "fault";
  wherein,
  in a case where the fault of the controller of the adjacent node has occurred,
  the controller of the adjacent node falls into a state where it cannot refer to its path state table because the path state table is faulty, and it maintains the path;
  the controller of the node has detected the fault owing to the detection of timeout between the controller of the node and the controller of the adjacent node, and the controller of the node therefore sets the adjacent node state of the adjacent node state table as a control plane failure;

the controller of the node checks the state of the transmission equipment of its own node, and maintains the path because the switch state table or the IF state table is being used; and since a normal controller does not exist on a side of the controller of the adjacent node, the controller of the node does not send the refresh message to the side of the controller of the adjacent node, and sends the refresh message to the other adjacent node if the normal controller exists;

whereby, at the time when the fault has occurred in the controller of the control plane and when any fault has not occurred in the data plane, the path state is maintained without tearing a data channel which is being used.

9. A communication node as defined in claim 8, wherein:

when the controller of the adjacent node has recovered from the fault, the controller of the adjacent node notifies a message of the fault recovery to the other adjacent node and makes a request for recovery of the path;

the controller of the node being adjacent notifies path state data contained in the path state table, to the controller of the adjacent node on the basis of the path state table stored by the information of the message communicated with the controller of the adjacent node before the fault;

the controller of the adjacent node inquires of the transmission equipment of its own node about the switch state, and the transmission equipment of the adjacent node notifies switch state data to the controller of the adjacent node, with reference to the switch state table of the transmission equipment of the adjacent node;

the controller of the adjacent node recovers the IF state table and the path state table in accordance with the notified path state data and switch state data; and the controller of the adjacent node sends the recovered message to the controller of the node;

whereby the controller of the adjacent node recovers the path state without reassigning the resources or tearing the path.

10. A communication node as defined in claim 8, wherein:

when the fault has occurred in the controller of the adjacent node, and further, the fault has occurred in the transmission equipment of the adjacent node, the transmission equipment of the node receives a fault signal from the transmission equipment of the adjacent node, so as to detect the fault of the transmission equipment of the adjacent node and to set a fault or fault alert detection state in the switch state table of the transmission equipment of the node;

after having detected the fault of the control plane, the controller of the node checks the state of the transmission equipment of its own node, and the controller of the node removes the entry of the path state in the path state table and then cleans up the resources, because the switch state table is in the fault or fault alert detection state; and the transmission equipment of the node sets the IF state of the switch state table in an unused state, and the transmission equipment of the node notifies a command of removing the path state, to controller of the other adjacent node on a side opposite to the adjacent node;

thereby to prevent a resource leakage state where the resources are held limitlessly, at the fault of the data plane.

11. A communication node as defined in claim 1, wherein:

each of the controller of the adjacent node and the controller of the node includes:

an adjacent node state table which stores an adjacent node state containing a fault or normal state of an upstream adjacent node and a fault or normal state of a downstream adjacent node, in correspondence with a session ID; and an IF state table which stores a switch state of the transmission equipment as contains an incoming IF, an outgoing IF, and an IF state containing "being used" or "fault";

each of the transmission equipment of the adjacent node and the transmission equipment of the node includes:

a switch state table which stores the switch state of the transmission equipment as represents the incoming IF, the outgoing IF, and the IF state containing "being used" or "fault";

wherein, in a case where a fault has occurred in a communication interface portion of the control plane of the adjacent node:

the controller of the adjacent node detects the fault by grasping the fault as an abnormality of the controller of the adjacent node, and sets the adjacent node state table of the controller of the adjacent node as control plane failures of both the upstream and downstream adjacent nodes;

the controller of the adjacent node checks the state of the transmission equipment of the adjacent node, and maintains the path because the switch state table or the IF state table is being used, and the controller of the adjacent node does not send the refresh message because both the adjacent nodes are faulty;

the controller of the node adjacent to the adjacent node senses refresh timeout, and detects the abnormality of the controller of the adjacent node, and the controller of the node sets the adjacent node table of the controller of the node as the control plane failure of the adjacent node on the adjacent node side; and the controller of the node checks the state of the transmission equipment of its own node, maintains the path because the IF state of the transmission equipment of the node is being used in the switch state table or the IF state table, and the controller of the node sends the refresh message when a normal controller exists in the other adjacent node on the opposite side to the adjacent node of the controller of the node, and does not send the refresh message to the adjacent node side;

whereby, when the fault does not occur in the data plane, the path state is maintained without tearing down a data channel which is being used.

12. A controller which communicates a message with a first adjacent controller being adjacent to the controller and which manages a transmission equipment communicating user data with an adjacent transmission equipment, wherein:

the controller detects existence or nonexistence of a fault of the first adjacent controller on the basis of situation of receiving a message sent from the first adjacent controller;

when the controller detects the fault of the first adjacent controller, the controller issues a state reference notice to the transmission equipment, acquires a state of an interface of the transmission equipment by receiving a state report notice to the state reference notice, and checks existence or nonexistence of fault alert detection which is included in the acquired state of the interface of the transmission equipment; and in a case where the fault alert detection of the transmission equipment does not exist, the controller maintains a path state between the transmission equipment and the first adjacent transmission equipment being adjacent to the transmission equipment.

13. A controller as defined in claim 12, wherein when the second adjacent controller which is the other adjacent controller different from a controller whose fault has been detected exists, the controller sends a message to the second adjacent controller and maintains the path state between a second transmission equipment managed by the second adjacent controller and the transmission equipment.

14. A controller as defined in claim 12, wherein, in case where the fault alert detection of the transmission equipment exists, the controller removes an entry of the path state in a path state table which is included in the controller and which stores path states, and then cleans up resources.

15. A communication system which has a communication node comprising a transmission equipment which communicates user data with a transmission equipment of an adjacent node, and a controller which communicates a message with a controller of the adjacent node and which manages the transmission equipment of its own node, wherein:

a controller of the node detects existence or nonexistence of a fault of a controller of the adjacent node on the basis of situation of receiving a message sent from the controller of the adjacent node;

when the controller of the node detects the fault of the controller of the adjacent node, the controller of the node issues a state reference notice to a transmission equipment of its own node, acquires a state of an interface of the transmission equipment of its own node by receiving a state report notice to the state reference notice, and checks existence or nonexistence of fault alert detection which is included in the acquired state of the interface of the transmission equipment of its own node; and in a case where the fault alert detection of the transmission equipment of the node does not exist, the controller of the node maintains a path state of the node.

16. A communication system as defined in claim 15, wherein when a normal controller exists in the other adjacent node on an opposite side to the adjacent node having the controller whose fault has been detected, the controller of the node sends a message to the normal controller and maintains the path state with the other adjacent node.

17. A communication system as defined in claim 15, wherein, in case where the fault alert detection of the transmission equipment of the node exists, the controller of the node removes an entry of the path state in a path state table which is included in the controller of the node and which stores path states, and then cleans up resources.

* * * * *